(12) United States Patent
Wiese et al.

(10) Patent No.: US 12,713,480 B2
(45) Date of Patent: Aug. 18, 2026

(54) AUTOMATIC PAIRING OF DEVICES TO A COMMUNICATION GATEWAY

(71) Applicant: SYSTECH CORPORATION, San Diego, CA (US)

(72) Inventors: Anderson Wiese, San Diego, CA (US); Robert Lutz, San Diego, CA (US)

(73) Assignee: SYSTECH CORPORATION, San Diego, CA (US)

( * ) Notice: Subject to any disclaimer, the term of this patent is extended or adjusted under 35 U.S.C. 154(b) by 440 days.

(21) Appl. No.: 18/023,572

(22) PCT Filed: Aug. 31, 2021

(86) PCT No.: PCT/US2021/048485
§ 371 (c)(1),
(2) Date: Feb. 27, 2023

(87) PCT Pub. No.: WO2022/051289
PCT Pub. Date: Mar. 10, 2022

(65) Prior Publication Data

US 2023/0328815 A1 Oct. 12, 2023

Related U.S. Application Data

(60) Provisional application No. 63/073,066, filed on Sep. 1, 2020.

(51) Int. Cl.
*H04W 76/14* (2018.01)
*H04W 4/80* (2018.01)
*H04W 88/16* (2009.01)

(52) U.S. Cl.
CPC ............ *H04W 76/14* (2018.02); *H04W 4/80* (2018.02); *H04W 88/16* (2013.01)

(58) Field of Classification Search
CPC ................................ H04W 76/14; H04W 5/80
(Continued)

(56) References Cited

U.S. PATENT DOCUMENTS 9,721,466 B2 8/2017 Sallas et al.
2009/0063187 A1* 3/2009 Johnson ................ H04L 45/308 705/2
(Continued)

FOREIGN PATENT DOCUMENTS

CN 108259551 A 7/2018

OTHER PUBLICATIONS

International Search Report and Written Opinion for PCT/US 21/48485, mailed on Dec. 1, 2021. 12 pages.
(Continued)

*Primary Examiner* — Sibte H Bukhari
(74) *Attorney, Agent, or Firm* — Procopio, Cory, Hargreaves & Savitch LLP

(57) ABSTRACT

Systems and methods are provided herein for automated pairing of external devices to a gateway. An example method may include retrieving, by the gateway, device identifiers of the external devices associated with a gateway identifier of the gateway device, the device identifiers retrieved over a network interface between the gateway device and a database storing the device identifiers. The method also includes receiving, by the gateway, a first device identifier from a first external device over a local-area communication interface between the first external device and the gateway device, the local-area communication interface implemented according to a local area transport protocol. The method further includes determining that the first device identifier is valid based on the device identifiers retrieved from the database,
(Continued)

and, based on the determination, executing a pairing process with the first external device according to the local-area transport protocol.

18 Claims, 6 Drawing Sheets

(58) Field of Classification Search
USPC .......................................................... 370/328
See application file for complete search history.

(56) References Cited

U.S. PATENT DOCUMENTS

2015/0281392 A1* 10/2015 Kim ...................... H04L 67/568
709/224
2020/0053095 A1 2/2020 Friant et al.

OTHER PUBLICATIONS

Extended European Search Report dated Jul. 10, 2024 from European Patent Application No. 21864991.1.

* cited by examiner

AUTOMATIC PAIRING OF DEVICES TO A COMMUNICATION GATEWAY

RELATED APPLICATIONS INFORMATION

This application claims the benefit of U.S. provisional patent application Ser. No. 63/073,066, filed Sep. 1, 2020 and entitled "AUTOMATIC PAIRING OF DEVICES TO A COMMUNICATION GATEWAY," which is hereby incorporated by reference in its entirety.

FIELD OF THE INVENTION

The embodiments described herein are generally directed to communication gateways, and, more particularly, to automatically pairing external devices to communication gateways.

INTRODUCTION

The use of machine-to-machine (M2M) systems is and will continue to be a prevalent aspect of commerce and society. M2M systems are an integral part of the Internet of Things (IoT), and have a wide range of applications, including monitoring and control for industrial and building automation, smart facilities, smart grids, smart cities, healthcare, hospitality, food services, and the like.

In M2M and IoT ecosystems, communications between devices in a machine-to-machine system may be performed using a gateway device positioned between the devices. The gateway device may also provide additional services, such as the secure execution of applications, including control, monitoring, reporting, and alerting scripts, the configuration and activation/deactivation of one or more devices, device types, and/or device groups, and data capture and reporting for devices, device types, and/or device groups communicatively connected to the gateway device.

As a simple example, in the context of healthcare, various devices within a physical facility (e.g., a clinic, hospital, other care provider facilities, and/or the home) may be communicatively connected to a gateway device for the facility. These devices may comprise health related smart devices and remote patient monitor (RPM) devices (e.g., blood pressure cuffs, blood glucose monitors, smart weight scales, fall detectors, pulse oximeters, spirometers, etc.). These devices typically collect data to monitor the health parameters or other activity of the patient and upload the data to a database, such as a cloud instance for storage and utilization for different applications (e.g., analysis by a care provider, personal monitoring, etc.). The gateway device may execute one or more control scripts which monitor one or more of the devices (e.g., by receiving data therefrom) and provide a link between the devices to the cloud. For example, the devices may be linked to the gateway over a Bluetooth™ connection, while the gateway manages a wireless connection to the cloud via a wide-area network.

As another simple example, in the context of industrial automation, various devices within a physical facility may be communicatively connected to a gateway device for the facility. These devices may comprise sensors (e.g., temperature sensors, open/closed sensors, locked/unlocked sensors, motion detectors, luminosity sensors, etc.) and operable devices, such as doors, windows, locks, lights, gates, valves, etc. The gateway device may execute one or more control scripts which monitor one or more of the devices (e.g., by receiving temperature measurements from a temperature sensor, receiving the status of a door lock, etc.) and control one or more of the devices based on the monitoring of other devices and/or conditions (e.g., turning on a light if a gate is opened, unlocking or locking a door at a certain time, sounding an alarm if a temperature exceeds a certain threshold, etc.).

However, conventional Bluetooth™ connections require user intervention at one or both end points of a Bluetooth™ connection (e.g., the device and the gateway) to discover, pair, and establish a connection there between. Thus, what are needed are technologies that enable simplification and increased efficiency of the process for connecting devices to gateways within M2M, IoT, cloud-based, and/or distributed-server-based systems.

SUMMARY

Accordingly, systems and methods are disclosed for automatically and securely pairing one or more external devices to a gateway without end-user intervention. The systems and methods disclosed herein utilize a procedure to associate one or more unique device identifiers (IDs) with a unique gateway ID at the time the devices and gateway are kitted (or bundled) together, for example, during manufacturing or at a distribution point. The method also performs a secure pairing procedure between one or more devices and one or more gateways based on a comparison of device IDs obtained from the one or more devices and the one or more device gateway IDs. During the pairing procedure, it is not necessary for user intervention or activity.

In an aspect, a method for automated pairing of one or more external devices to a gateway device is provided. The method may include retrieving, by the gateway device, device identifiers of the one or more external devices associated with a gateway identifier of the gateway device. In some embodiments, the device identifiers are retrieved over a network interface between the gateway device and a database storing the device identifiers. The method also includes receiving, by the gateway device, at least a first discovery signal from a first external device over a local-area communication interface between the first external device and the gateway device, the first discovery signal comprising a first device identifier of the first external device, and the local-area communication interface implemented according to a local area transport protocol; determining, at the gateway device, that the first device identifier is a valid device identifier based on the device identifiers retrieved over the network interface; and, based on the determination, executing a pairing process with the first external device according to the local-area transport protocol.

In another aspect, a gateway apparatus for automatic pairing with one or more external devices is provided. The gateway apparatus may include at least one network interface configured to communicate with a network, at least one local-area communication interface configured to communicate with the one or more external devices according to a local-area transport protocol, at least one memory configured to store instructions; and one or more processors coupled to the at least one network interface, the at least one local communication interface, and the at least one memory. The one or more processors are configured to retrieve, by the gateway device, device identifiers of the one or more external devices associated with a gateway identifier of the gateway device. In some embodiments, the device identifiers are retrieved over a network interface between the gateway device and a database storing the device identifiers. The one or more processors are further configured to receive, by the gateway device, at least a first discovery signal from a first external device over a local-area communication interface between the first external device and the gateway device, the first discovery signal comprising a first device identifier of the first external device, and the local-area communication interface implemented according to a local area transport protocol; determine, at the gateway device, that the first device identifier is a valid device identifier based on the device identifiers retrieved over the network interface; and based on the determination, execute a pairing process with the first external device according to the local-area transport protocol.

In another aspect, a system for automated pairing of one or more end user devices to a gateway device is provided. The system comprises at least a database on a network and the gateway device. The database is configured to store a gateway identifier of the gateway device associated with device identifiers of the one or more end user devices. The gateway device comprises a wide-area communication module configured to communicate with the network; and a short-range communication module configured to communicate with the one or more end user devices according to a short-range communication protocol. The gateway device is configured to retrieve the device identifiers from the database over the wide-area communication module based on the gateway identifier; receive a first device identifier from a first end user device over the short-range communication module; determine that the first device identifier is a valid device identifier based on the device identifiers retrieved from the database; and based on the determination, execute a pairing process with the first end user device according to the short-range communication protocol.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
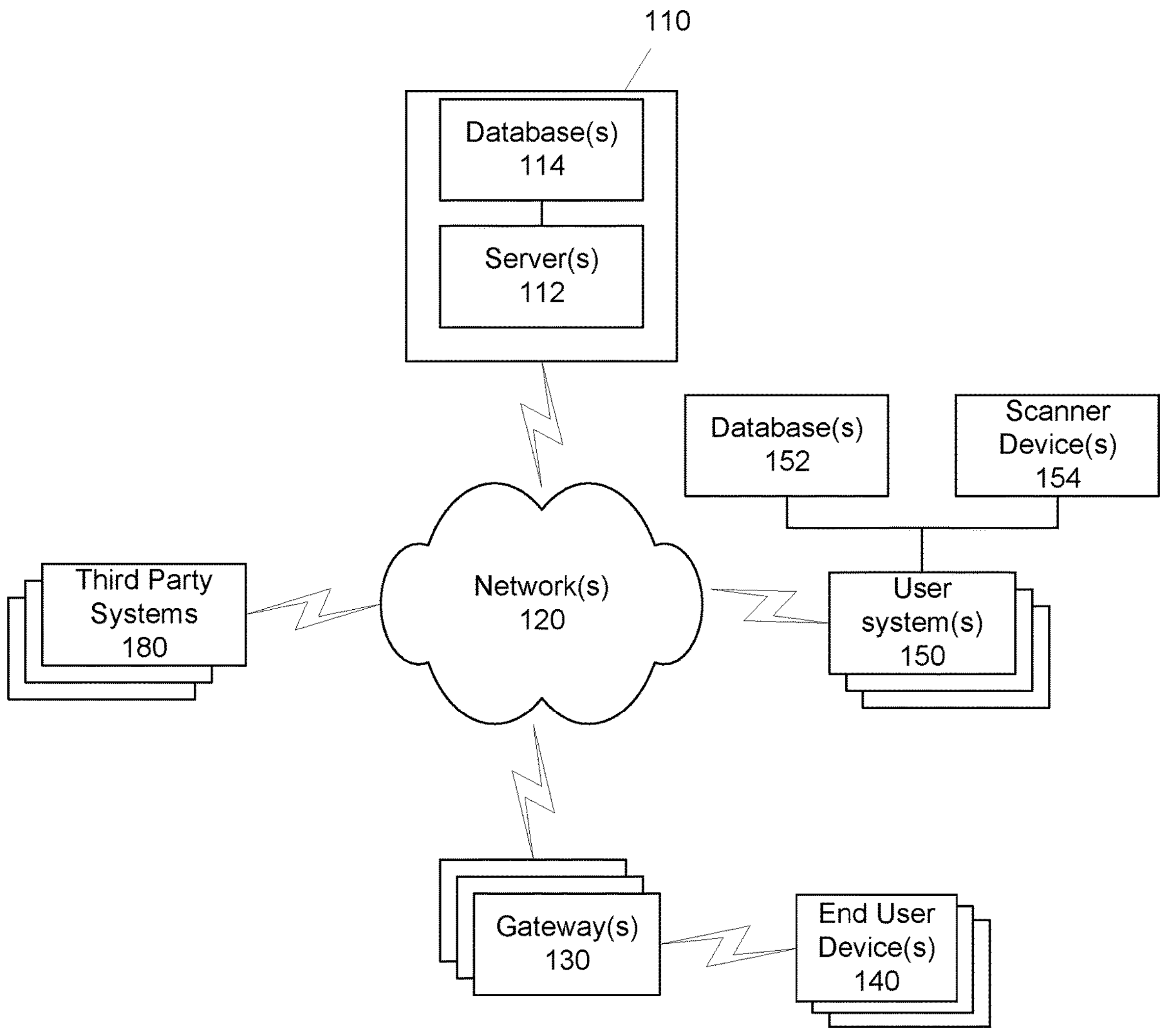
FIG. 1 illustrates an infrastructure in which embodiments of disclosed systems, methods, and media may operate, according to embodiments disclosed herein.

In an embodiment, systems, methods, and media are disclosed for the management of gateways and devices, including the execution, creation, configuration, testing, implementation, operation, updating, backing-up, and recovery of virtual gateways, physical gateways, control scripts, devices, and/or device information (e.g., device drivers, and/or definitions and/or configurations for devices, device types, and/or device groups). After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

Accordingly, embodiments herein provide for automatically pairing one or more external devices to a gateway for securely linking external devices to a gateway. The link may be established to facilitate communications using, for example, but not limited to, Bluetooth™ Z-wave™, ZigBee™, Wi-Fi™, etc. Various embodiments disclosed herein utilize a procedure to associate one or more device identifiers (IDs) with one or more gateway IDs and perform the automated and secure pairing procedure between one or more devices and one or more gateways based on a comparison of device IDs obtained from the one or more devices and the gateway IDs associated with the one or more gateways.

The embodiments herein advantageously provide a process to securely pair one or more external devices to one or more gateways without the need to activate or apply power to the devices and/or the gateways. That is, the external devices and the gateways may be configured, prior to activation, to recognize each other as valid and authenticated devices prior to devices or gateways being activated. Completion of association or pairing of the gateway and external devices may not take place until the devices are activated, but the requirement of user intervention to turn on this function and select a discoverable device for association or pairing is removed.

For example, a gateway and a connected external device may be bundled (or kitted) at a distribution point. In some implementations, the devices and gateway may be bundled into the same box prior to shipment, and in other implementations the devices and gateway may be in separate boxes and shipped to the same location. As the devices and the gateway are bundled together an ID of each device and gateway are obtained and the information is sent to a cloud server (also referred to as a cloud based storage system). The devices are virtually paired in the cloud server, even though they are not yet physically paired. The devices and gateway can remain in their boxes and do not need to be powered up.

Later, when the bundle is delivered to a home, clinic, warehouse, commercial location, or any delivery location the gateway may be unboxed and powered up. At that time the gateway will automatically access the cloud server and retrieve the pairing information that was stored in the cloud server during bundling. When the individual devices are first activated, the devices will share its ID. Since the gateway knows exactly which devices it should pair with based on the pairing information retrieved from the cloud server, the gateway will initiate a secure pairing operation with the known devices. No user interaction is required. Devices with matching IDs will pair and communicate automatically. However, if a foreign device is nearby, the gateway will not interact with the foreign device. The foreign device will not interfere with the gateway.

Typically, a user is required to intervene to activate and accept prompts (and sometimes enter a passcode or PIN number) in order to initiate and complete association and/or pairing of devices for communication using communication standards (e.g., Bluetooth™, Z-wave™, ZigBee™, Wi-Fi™, etc.). Whereas, embodiments disclosed herein are pre-configured to recognize unique IDs for devices and gateways to facilitate an automated and secure association and/or pairing procedure. Embodiments here may be useful to allow a distributor to bundle one or more external devices with one or more gateways from an existing inventory of products and ship to a customer without the need to activate or apply power to the devices or gateways prior to shipment. While various embodiments herein are described in the context of Bluetooth™ association and/or pairing procedures, it will be appreciated that similar or the same procedures for automating the association and/or pairing is applicable to other types of communication standards, such as, but not limited to, Z-wave™, ZigBee™, Wi-Fi™, and/or the like.

An example implementation of embodiments herein is provided in connection with healthcare related devices (e.g., remote patient monitors (RPM), smart weight scales, etc.). Such devices may be distributed in a health care provider facility and/or the home and utilize a communication gateway as a link to, for example, a cloud-based database (e.g., a cloud server or other storage system) for storage of health monitored data. The devices may be communicatively coupled to the gateway via Bluetooth™ (or other communication standard) and the gateway may be wired or wireless coupled to a network (e.g., the Internet) for communicating with the cloud-based database. The gateway therefor may provide a link or hub to the cloud-based database while providing security from other devices that are not authenticated or validated for access to the cloud-based database. By utilizing the association or pairing functionality according to the embodiments provided herein, distributors of such devices may pre-configure access for only those devices deemed valid via the bundling (sometimes also described as kitting) process to associate device IDs of valid devices with gateway IDs of one or more gateways that will operate to connect the device to the cloud-based database. The devices and gateways may then be bundled and distributed to end users. Upon activating or powering on the devices and gateway at the end user location, an automated association or pairing process may be executed that utilizes the associated IDs to ensure only valid devices connect to the gateway and thus are provided access to the cloud-based database.

While the above example is described in connection with healthcare devices and health monitoring devices, it will be appreciated that the embodiments disclosed herein may be equally applicable to any other device in an IoT ecosystem, including, but not limited to, industrial and building automation, smart facilities, smart grids, smart cities, hospitality, food services, and the like. For example, in the context of industrial automation, various devices (e.g., sensors such as temperature sensors, open/closed sensors, locked/unlocked sensors and operable devices, such as doors, windows, locks, lights, gates, valves, etc.) within a physical facility may be bundled with a gateway and communicatively coupled to a gateway via the automated pairing functionality according to the embodiments provided herein.

In an illustrative embodiment, a unique device ID (sometimes referred to herein as a device ID) of an external device or devices (sometimes referred to herein as a device) and a unique gateway ID (sometimes referred to herein as a gateway ID) of a gateway are obtained. For example, they could be provided by the OEM of the devices and of the gateway, obtained from a database, read from the device and/or gateway, and/or read from a package for the device and/or gateway. In some embodiments, the gateway ID may be retrieved by activating the gateway and retrieving the ID from the gateway. The device ID and gateway ID are associated with each other and are transmitted to a database via a network. The device and gateway may be bundled and shipped to an end user in a single package or multiple packages. The end user or end users may then activate (power on) the gateway, which uses its gateway ID to retrieve, from the database, any device IDs associated with the gateway ID. The gateway ID may be stored in a memory of the gateway. When the external device is powered on, it transmits a discovery signal comprising its device ID, which is stored in memory of the external device. The gateway obtains the device ID and compares it to those included in the retrieved list. If there is a match, then the device is deemed valid and an association or pairing procedure is performed in accordance with the protocols of the communication standard utilized by the device and gateway. Once securely linked, communication can be established between the device and the cloud-based database via the gateway. If a match is not found, then the device is not permitted to communicate with the gateway or cloud-based database. Similarly, if a match exists, a communication link may be established via the automated association or pairing functionality disclosed herein to allow external communication (e.g., via the internet for example) based upon information received from the device. For example, the device may be a sensor that communicates a sensor reading to the gateway, executes a control script on another system and/or communicates the reading to a user.

1. System Overview

1.1. Infrastructure

FIG. 1 illustrates an example system for automated device to gateway association or pairing, according to embodiments disclosed herein. The system may include a platform 110 comprising a set of one or more servers 112 which host and/or execute one or more of the various functions, processes, methods, and/or software modules described herein. It should be understood that platform 110 may comprise a cloud environment (e.g., a cloud based storage system including one or more servers and a cloud based database) which may or may not be dedicated to the processes disclosed herein (e.g., FIGS. 4 and 5). In a cloud environment, resources, such as virtual, logical, and/or physical computing resources, storage resources, security resources, communications resources, management resources, and the like, may be shared and/or dedicated among services and applications.

In addition, platform 110 may be communicatively connected (e.g., via one or more components, such as a communications resource of platform 110) to one or more communication gateways 130 (referred to herein as a "gateway") and/or one or more user systems 150 via one or more network(s) 120 and may also be communicatively connected to one or more database(s) 114 (e.g., via one or more network(s), such as network(s) 120 or a private network, or via a direct connection) and/or may comprise one or more database(s) 114. Network(s) 120 may comprise the Internet, and server(s) 112 may communicate with gateway(s) 130 and user system(s) 150 (also referred to herein as an ID obtaining system) through the Internet using standard transmission protocols, such as HyperText Transfer Protocol (HTTP), Secure HTTP (HTTPS), File Transfer Protocol (FTP), FTP Secure (FTPS), SSH FTP (SFTP), and the like, as well as proprietary protocols. It should also be understood that the components of platform 110 (e.g., cloud resources, such as server(s) 112) may be, but are not required to be, collocated. Furthermore, while platform 110 is illustrated as being connected to various systems through a single set of network(s) 120, it should be understood that platform 110 may be connected to the various systems via different sets of one or more networks. It should also be understood that gateway(s) 130 and/or user system(s) 150 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, Automated Teller Machines, Point-of-Sale (POS) terminals, intelligent wearable devices, medical or healthcare devices (e.g., heart rate monitoring devices, blood pressure monitoring devices, smart weight scales, etc.), any device within an IoT ecosystem, and the like. Gateway 130 may be implemented as any hardware device that acts as a gate between networks to form a link for data to flow from one discrete network to another, for example, by establishing a first communication link between the gateway 130 and a first device (e.g., external device 130) and a second communication link between the gateway 130 and a second device (e.g., device of network 120). The gateway 130 may be implemented as a router, firewall, server, hub, or any device that enables traffic to flow in and out of the network. An example wired or wireless system that may be implemented as gateway(s) 130 and/or user system(s) 150 is illustrated as wired or wireless system 600 of FIG. 6. In addition, each gateway 130 may be communicatively connected with one or more devices and/or other gateways 130. While only a few gateways 130, external devices 140, and user systems 130, one platform 110, one set of server(s) 112, and one set of database(s) 114 are illustrated, it should be understood that the infrastructure may comprise any number of gateway(s), device(s), user system(s), platform(s), sets of server(s), and database(s).

Platform 110 may comprise web servers that host one or more websites or web services. In embodiments in which a website is provided, the website may comprise one or more user interfaces, including, for example, webpages generated in HyperText Markup Language (HTML) or other language (e.g., a graphical-based and/or text-based language). Platform 110 transmits or serves these user interfaces in response to requests from user system(s) 150. It should be understood that user system(s) 150 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, Automated Teller Machines, Point-of-Sale (POS) terminals, intelligent wearable devices, medical or healthcare devices, any device within an IoT ecosystem, and the like.

In some embodiments, these user interfaces may be served in the form of a wizard, in which case two or more user interfaces may be served in a sequential manner, and one or more of the sequential user interfaces may depend on an interaction of the user or user system 150 with one or more preceding user interfaces. The requests to platform 110 and the responses from platform 110, including the user interfaces, may both be communicated through network(s) 120, which may include the Internet, using standard communication protocols (e.g., HTTP, HTTPS). These user interfaces or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) or devices that are locally and/or remotely accessible to platform 110. Platform 110 may also respond to other requests from user system(s) 150.

Platform 110 may further comprise, be communicatively coupled with, or otherwise have access to one or more database(s) 114. For example, platform 110 may comprise one or more database servers that manage one or more databases 114. A user system 150 or application executing on platform 110 may submit data (e.g., user data, form data, etc.) to be stored in the database(s) 114, and/or request access to data stored in such database(s) 114 (e.g., if requested by an entitled user). Any suitable database may be utilized, including without limitation, any relational or non-relational database, datastore, data blob, and the like, including cloud-based database instances and proprietary databases. Data may be sent to platform 110, for instance, using the well-known POST request supported by HTTP, via FTP, other common protocols, proprietary protocols, etc. Data may be requested or retrieved from platform 110, for instance, using the well-known GET request supported by HTTP, via FTP, other common protocols, proprietary protocols, etc. This data, as well as other requests, may be handled, for example, by cloud-side and/or server-side web technology, such as a servlet or other software module, executed by platform 110. In addition, platform 110 may provide caching to speed up response times (e.g., for common requests).

3.2.3. User Systems

In embodiments in which a web service is provided, platform 110 may receive requests from user system(s) 150, and provide responses in eXtensible Markup Language (XML) and/or any other suitable or desired format. In such embodiments, platform 110 may provide an application programming interface (API) which defines the manner in which user system(s) 150 may interact with the web service. Thus, user system(s) 150, which may themselves be cloud environments and/or servers, can define their own user interfaces, and rely on the web service to implement or otherwise provide the backend processes, methods, functionality, storage, etc., described herein. For example, in such an embodiment, a client application executing on one or more user system(s) 150 may interact with a server application executing on platform 110 to execute one or more or a portion of one or more of the various functions, processes, methods, and/or software modules described herein. The client application may be "thin," in which case processing is primarily carried out cloud-side and/or server-side by platform 110. A basic example of a thin client application is a browser application, which simply requests, receives, and renders web pages at user system(s) 150, while platform 110 is responsible for generating the web pages and managing database functions. Alternatively, the client application may be "thick," in which case processing is primarily carried out client-side by user system(s) 150. It should be understood that the client application may perform an amount of processing, relative to platform 110, at any point along this spectrum between "thin" and "thick," depending on the design goals of the particular implementation. In any case, the application, which may wholly reside on either platform 110 or user system(s) 150 or be distributed between platform 110 and user system(s) 150, can comprise one or more executable software modules that implement one or more of the processes, methods, or functions of the application(s) described herein.

In various embodiments, user system(s) 150 may be system or wired and/or wireless computing devices implemented by a bundling service. For example, a user may provide one or more gateway 130 that are bundled with one or more external devices 140. Unique identifiers (ID) for one of the gateways 130 and a device 140 may be obtained, associated with each other, and transmitted to the database(s) 114 as a pair. For each gateway 130, having a unique gateway ID, a plurality of unique device ID for a plurality of external devices 140 may be obtained and associated therewith. Each unique device ID of device(s) 140 may be obtained, associated with the unique gateway ID of the gateway 130, and transmitted separate from the others. In another example, a plurality of unique device IDs for devices 140 may be obtained, associated, and transmitted as a batch or collection of ID to be associated with the unique gateway ID of the gateway 130.

Unique IDs may be associated with the gateway 130 and/or external devices 140, for example, in database(s) 152 organized by serial and/or product number. Thus, the unique IDs for each device and/or gateway may be obtained from a look up database. Database(s) 152 may be similar to the database(s) 114 as described above. Obtaining the unique IDs may comprise retrieving the unique IDs from database(s) 152 and transmitting the associated pair (or group) to the platform 110. In another example, the unique IDs may be provided by the OEM of the external device 140 and/or gateway 130. In yet another example, the unique IDs may be retrieved from the external device 130 and/or gateway 140 itself, for example, by activating the device and reading the ID from a signal emitted by the external device 130 and/or gateway 140.

In another example, alone or in combination, the unique IDs may be affixed to the gateway(s) 130 and/or device(s) 140 and/or a package for shipping the gateway(s) 130 and/or device(s) 140, for example, by a label or tag that contains the unique ID. The tag or label may be in the form of a barcode, a QR code, or other uniquely identifiable code that is attached to or otherwise printed onto the gateway(s) 130 and/or device(s) 140. In some embodiments, the unique ID may be stored in an RFID tag affixed onto the respective gateway and/or device. Thus, the unique ID may be retrieved using one or more scanner device(s) 154 to scan the label or tag and obtain the unique ID, for example but not limited to, using a bar code scanner, image capture device (e.g., a camera), an RFID reader, etc. The scanner device(s) 154 may be operated and held by a user (e.g., hand-held devices) and/or automated scanners disposed along a conveyor belt system for moving devices 140 and/or gateway 130 about a warehouse or distribution center. Once obtained, the user system 150 may then associate and transmit the pair (or group of) unique IDs to platform 110.

The unique device ID and/or gateway ID may be any string of characters that uniquely identifies the gateway and/or device. Example IDs include, but are not limited to, a serial number, network Machine Address Code (MAC), and the like. In some embodiments, the unique ID may be a Bluetooth™ device address (referred to herein a BD_ADDR) and/or device ID corresponding to a respective communication standard and/or protocol. In various embodiments, all that is required is that each ID is unique within the system, and visible to the process.

1.1.2. Gateways and Devices

Figure 2:
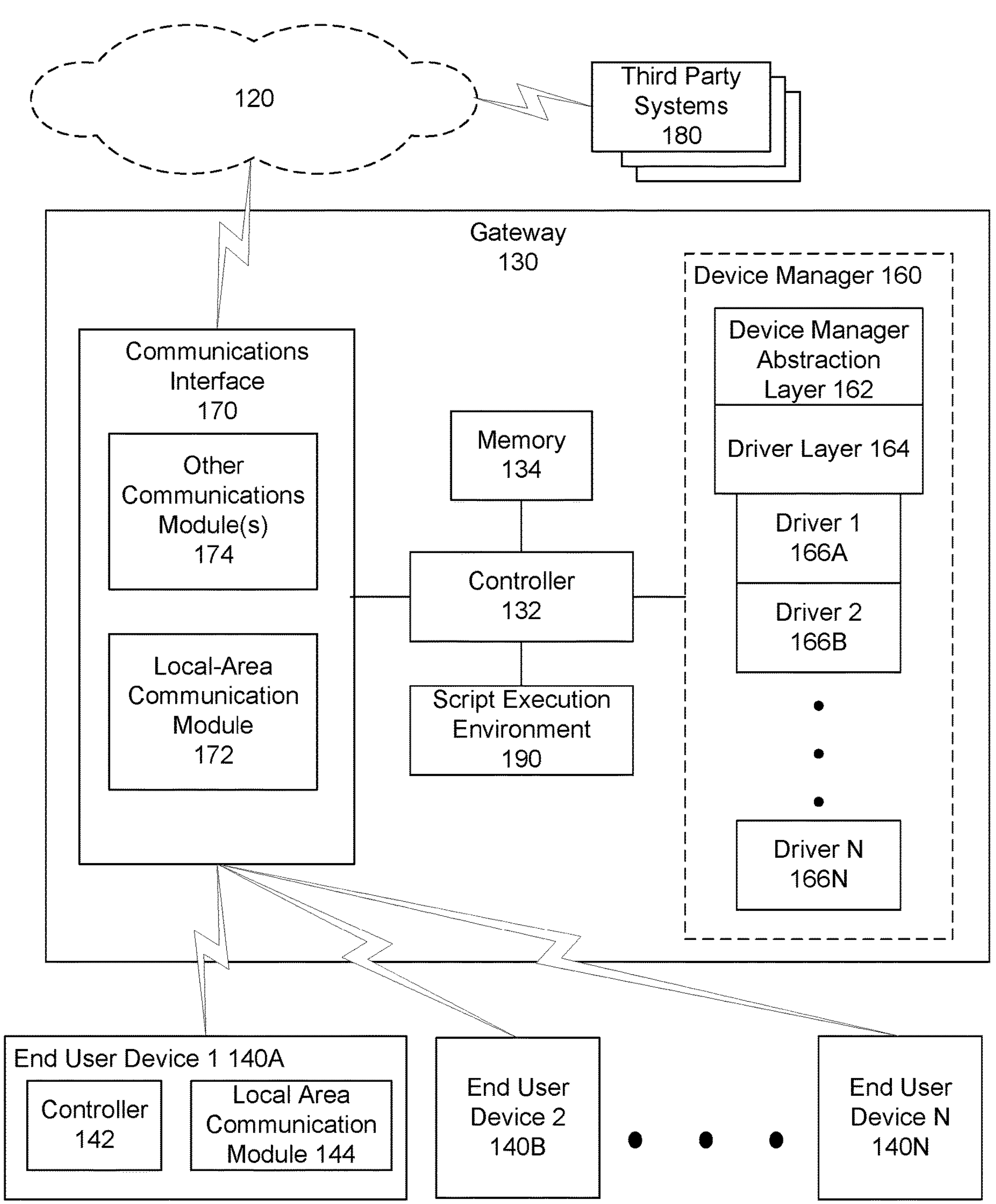
FIG. 2 illustrates a schematic block diagram of the infrastructure of FIG. 1, according to embodiments disclosed herein.

FIG. 2 illustrates a schematic block diagram of the infrastructure of system 100 of FIG. 1 with the platform 110 removed for illustrative purposes. As described above, the infrastructure comprises platform 110 communicatively coupled (e.g., via a wired and/or wireless connection) to gateway 130. FIG. 2 illustrates an example implementation of a gateway 130, which may be implemented as gateway 130. Gateway 130 may be implemented as any number of gateway(s) 130.

The gateway 130 may be one or more pieces of networking hardware used in telecommunications for telecommunications networks that allows data to flow from one discrete network to another. For example, the gateway 130 may form an indirect link between discrete devices by establishing a first communication link between the gateway 130 and a first device (e.g., the external device 140 for example) and a second communication link between the gateway 130 and a second device (e.g., the third party system 180 for example). Thus, data from the first device may be transmitted over the first communication link to the gateway 130, the gateway 130 executes a control script in script execution environment 190, and sends a signal based on the data to the second device over the second communication link. The signal may comprise forwarding the data and/or a control signal instructing the second device to perform some functionality based on the executed control script. Gateways 130 as used herein may be distinct from routers or switches in that the gateways may be configured to communicate using more than one protocol to connect multiple networks.

For example, the gateway 130 is configured to connect one or more external devices 140A-140N to third party systems 180 via network 120. Third party systems 180 may comprise a cloud environment which may be dedicated to processes performed by external devices 140 and provided for storage of data from external devices 140. The gateway 130 may be provided to facilitate a link between the external devices 140 and third party systems 180. It should be understood that third party system(s) 180 may comprise any type or types of computing devices capable of wired and/or wireless communication, including without limitation, cloud-based database(s), servers, desktop computers, etc. An example of a wired or wireless system that may be implemented as gateway(s) 130 and/or user system(s) 150 is illustrated as wired or wireless system 600 of FIG. 6. In various embodiments, a link is established between the external devices 140 and third party system 180 via gateway 130. That is, the external devices 140 communicate with the gateway 130 via the communications interface 170, the gateway 130 processes the data and/or executes a control script at the script execution environment 190 under control of controller 132, and communicates a signal to the third party system 180 based on the data from the external device 140.

While the third party system 180 is described as a cloud environment in the above example, it will be appreciated that the third party system 180 may be any system communicatively coupled to the network 120. For example, the third party system 180 may be an automated building, smart facilities, smart grid, smart city, or the like and the devices 140 may be IoT devices relevant for monitoring, controlling, and/or communicating with these systems.

While, as described above, gateway 130 may comprise any type of wired and/or wireless device capable of communication with platform 110, in various embodiments, each gateway 130 may be a proprietary device. Furthermore, in an embodiment, each gateway 130 manages one or more communicatively connected (e.g., wireless or wired) external devices 140.

Gateways 130 may refer to an IoT gateway configured as a bridge between IoT devices in the field, the cloud, and other user devices, such as, desktop computers, laptop computers, tablet computers, smart phones or other mobile phones. IoT gateways provide a communication link between the field and the cloud, and may provide offline services and real-time control of devices in the field. For example, gateway 130 implemented as an IoT gateway may provide a communication link between external devices 140 and third party system(s) 180.

To achieve sustainable interoperability in the IoT ecosystem, various architectures for data exchange protocols may be used, for example, bus-based (e.g., DDS, REST, XMPP) and/or broker-based (e.g., AMQP, CoAP, MQTT, JMI). Protocols that support information exchange between interoperable domains may be classified as message-centric (e.g., AMQP, MQTT, JMS, REST) or data-centric (e.g., DDS, CoAP, XMPP). Interconnected devices may communicate using lightweight protocols that don't require extensive CPU resources. C, Java, Python and similar scripting languages may be used for IoT applications.

Gateway(s) 130, according to some embodiments, may be network gateways that provide interoperability between networks and may include protocol translators, impedance matchers, rate converters, fault isolators, and/or signal translators. Network gateways may require the establishment of mutually acceptable administrative procedures between networks using the gateway.

Another example of a type of gateway that may be implemented as gateway(s) 130 is a cloud storage gateway, which is a network appliance or server which translates cloud storage APIs such as SOAP or REST to block-based storage protocols such as iSCSI, Fiber Channel or file-based interfaces such as NFS or CIFS.

In some embodiments, each gateway 130 may be selected from the family of modular gateways offered by Systech Corporation of San Diego, California. The SysLINK® and SysCORE family of products, offered by Systech Corporation includes multiple models that provide maximum flexibility for multiple configuration options. For example, the SysLINK® 500/800/1000/15000 model line encompasses low cost, single-purpose gateways that are typically used for simple bridging applications, as well as for simple Automatic Teller Machine (ATM), point-of-sale (POS), and vending applications. The SysLINK® 2000, 3000, and 4000 model lines are full-featured general-purpose gateways, bridges, and routers that support the connection of multiple devices across multiple local or remote networks, and are typically used in multi-purpose building, home, and remote-site applications. The SysLINK® and SysCORE family of devices can support combinations that include multiple local network connections and multiple broadband networks for Internet connectivity. However, it should be understood that other gateways from other manufacturers may also be utilized as one or more of the gateway(s) 130.

The gateway 130 comprises a communications interface 170, controller 132 wired or wireless coupled to a memory 134, and a device manager 160. The controller 132 may be implemented as or part of, for example, the wired and/or wireless computing devices 600 of FIG. 6 and the memory 134 may be a database (e.g., such as database 114) and/or one or more of memories 615 and 620 of FIG. 6. The memory 134 may be configured to store a unique gateway ID for the gateway 130. Additionally, device IDs may also be stored in memory 134, for example, in response to retrieving device IDs associated with the gateway ID from platform 110.

The gateway 130 may be configured to communicate with external devices via the communications interface 170. The communications interface 170 comprises a plurality of communication modules comprising wired and/or wireless communication components that facilitate communication over respective communication protocols. The wireless communication components may include an antenna system (e.g., antenna 670 of FIG. 6), a radio system (e.g., radio system 665 of FIG. 6), and a baseband system (e.g., baseband system 660 of FIG. 6). Thus, radio frequency (RF) signals are transmitted and received over the air by the antenna system of each respective module under the management of the respective radio system in accordance with the protocol implemented by each module.

Gateway 130 is able to communicate with one or more hardware device controllers 142 included in each of the external devices 140 over one or more local-area transport protocols via communications interface 170. The communications interface 170 comprises a local-area communication module 172 (also referred to as a short-range communication module or local-area communication interface) for communicating with a local-area communication module 144 of each external device 140 according to a local-area transport protocol (also referred to as a short-range communication protocol). In the illustrative example, the local area communication module 172 comprises a Bluetooth™ module for communicating with a Bluetooth™ module of each external device 140 comprised as part of the local area communication module 144. The communications interface 170 may comprise other module(s)as part of the local-area communication module or as additional local-area communication modules, such as, but not limited to, Z-wave™, ZigBee™, Wi-Fi™, and/or the like to facilitate communications with external devices 140A-140N.

The gateway 130 is also able to communicate with platform 110 over wide-range transport protocols, such as the Internet via one of other modules 174 of the communications interface 170. For example, the other modules 174 may comprise a wide-area communication module (also referred to as a network module or network interface) for communicating with platform 110 over a corresponding communication protocol. While gateway 130 will be primarily described as communicating with platform 110 over the Internet, it should be understood that gateway 130 may be configured to communicate with platform 110 using any conventional communication protocols. This ability to communicate over multiple protocols allows gateway 130 to be transport-agnostic and protocol-agnostic, and to address control systems over a wide-range of complexity.

The other communications modules 174 may also comprise an Ethernet port for connecting to a router and modem. In some embodiments, the communications interface 170 may itself comprise a cellular modem and/or be communicatively coupled to such a modem providing a cellular data connection with network 120 (for example as described in U.S. Provisional App. No. 63/019,493, the disclosure of which is incorporated by reference herein in its entirety).

The local-area communication modules 172 and 144 include a local-area communication antenna and a local-area communication chipset, and is capable of implementing all corresponding standards and protocols to provide for communications over the respective local-area communication module. For example, in the illustrative example where the local-area communication modules 172 and 144 comprise Bluetooth™ modules, each of Bluetooth™ modules 172 and 144 includes a Bluetooth™ antenna and a Bluetooth™ chipset (as illustratively shown in FIG. 3 below), and is capable of implementing all Bluetooth™ standards and protocols including a Bluetooth™ Low Energy (BLE) and Basic Rate (BR)/Enhanced Data Rate (EDR) protocols.

Bluetooth™ technical specifications are developed and published by the Bluetooth™ Special Interest Group (SIG). Bluetooth™ Core Specification Version 5.2, revision date Dec. 31, 2018, describe various features of the BLE standards, and is incorporated by reference herein in its entirety.

The specific options that are available for any particular configuration of gateway(s) may be controlled by the physical presence of hardware capabilities and/or, locally or remotely, by electronic configuration which is independent of the physical presence of hardware capabilities. The SysLINK® family of gateways, which may be used as one or more of gateways 130, comprise one or more of the following as comprised in other communications modules 174:

- one or more hardware upgrade slots that support cellular modules and/or other hardware options, including future hardware options;
- architectures that support 2G, 3G, 4G, and 5G cellular technologies (e.g., code division multiple access (CDMA), Evolution-Data Optimized (EVDO), Long-Term Evolution (LTE), Global System for Mobile Communications (GSM), Single-Carrier Radio Transmission Technology (1xRTT), High-Speed Packet Access (SPA+)), as well as future cellular technologies;
- one or more multiple Ethernet ports, including multiple Ethernet ports with multiple independent Internet Protocol (IP) addresses;
- one or more plain old telephone service (POTS) ports (e.g., v.90, v.92);
- one or more serial ports (e.g., with RS232, RS422, and/or RS485 physical interfaces) that may be configured as standard serial ports (e.g., for POS and/or security applications) and/or DEX and MDB ports (e.g., for vending applications);
- one or more Universal Serial Bus (USB) ports;
- one or more microSD slots;
- support for one or more local wireless technologies including Wi-Fi™ (e.g., 802.11 a/b/g/n), ZigBee™, Z-Wave™, Bluetooth™, near-field communication (NFC), ANT, etc.;
- one or more sensors (e.g., temperature sensor, motion sensor, etc.);
- one or more connectors for external general-purpose input/output (GPIO), for example, using GPIO and/or USB interfaces;
- one or more internal or external batteries; and/or
- support for local applications.

In an embodiment, the gateway 130 comprises a device manager 160, which provides for a wide variety of plug-in software drivers 166, each of which may be dynamically registered with device manager 160 and conform to a specified driver interface. Device manager 160 enables multiple different drivers 166 to be plugged into driver layer 164 through an API. Drivers 166 correspond to each external device 140. That is, for a given device to communicate properly with the gateway 130, the corresponding driver may be required to be installed onto the gateway 130. Drivers 166 may also correspond to components of the network and/or user system 150. Drivers 166 may be based on manufacture origin of the external device 140, model and/or serial number of the external device 140, and/or software versions executed by the external device 140. Drivers 166 may also correspond to components of the network and/or user system 150.

Each driver 166 may correspond to a hardware device controller 142, and is designed to communicate using a transport layer or protocol common with the controller 142. Each driver 166 may provide a software interface between the communications interface 170 and the gateway 130 operating systems for translating communications received at the communications interface 170 in a first protocol (e.g., common with controller 142) to a protocol that can be processed by the operating system of the gateway 130. The availability of a plurality of drivers 166 enables the creation of a heterogeneous system that is capable of communicating across multiple transport layers and protocols to a wide variety of different device types. A set of available plugin drivers 166, capable of communicating via a specific transport layer, can be combined, as needed, with the corresponding hardware controllers 142 to address all kinds of control system requirements, without requiring a commitment to a single underlying data architecture.

The drivers 166 may be isolated from the conventions and data requirements of the rest of the infrastructure components through driver layer 164, which comprises a data-driven adapter language that is dynamically invoked as values pass in either direction (e.g., to change property names, formatting, scaling, type, and other aspects) so that neither side of driver layer 164 is aware of what is happening on the other side of driver layer 164. This means that each driver 166 can exist independently and need not be changed as other aspects of the system change, facilitating rapid creation of drivers for a wide range of transport protocols with no impact on existing installations or architectures. Likewise, the broader infrastructure components (e.g., the data architecture, script execution environment 150, etc.) do not need to change to accommodate changes to the drivers. The only change that may need to be made, in response to a change on one or both sides of driver layer 164, is an update to schema definitions (e.g., represented in a data file on platform 110). This enables independent evolution on both sides of driver layer 164.

In an embodiment, driver layer 164 ensures that individual drivers 166 do not need to know the details of how data is stored and manipulated. Specifically, driver layer 164 translates device property values, names, scaling, formatting, and type between those received from the external device 140 (and/or network 120) and those used internally by each driver 166. This allows drivers 166 to be plugged into device manager 160 in a data-format-agnostic manner.

In an embodiment, device manager 160 provides bidirectional communication between the device controllers 142 and components of gateway 130. Device manager 160 may receive device-related commands either directly from script execution environment 190, or indirectly as the result of updates to data (e.g., a device property) occurring in the data to which gateway 130 is subscribed (e.g., via a communication path comprising controller 132 and communications interface 170, but excluding script execution environment 190). Additional details regarding the device manager 160 can be found in U.S. Pat. No. 10,116,461, the disclosure of which is incorporated herein in its entirety.

1.2. Bluetooth™ Architecture and Protocols

Figure 3:
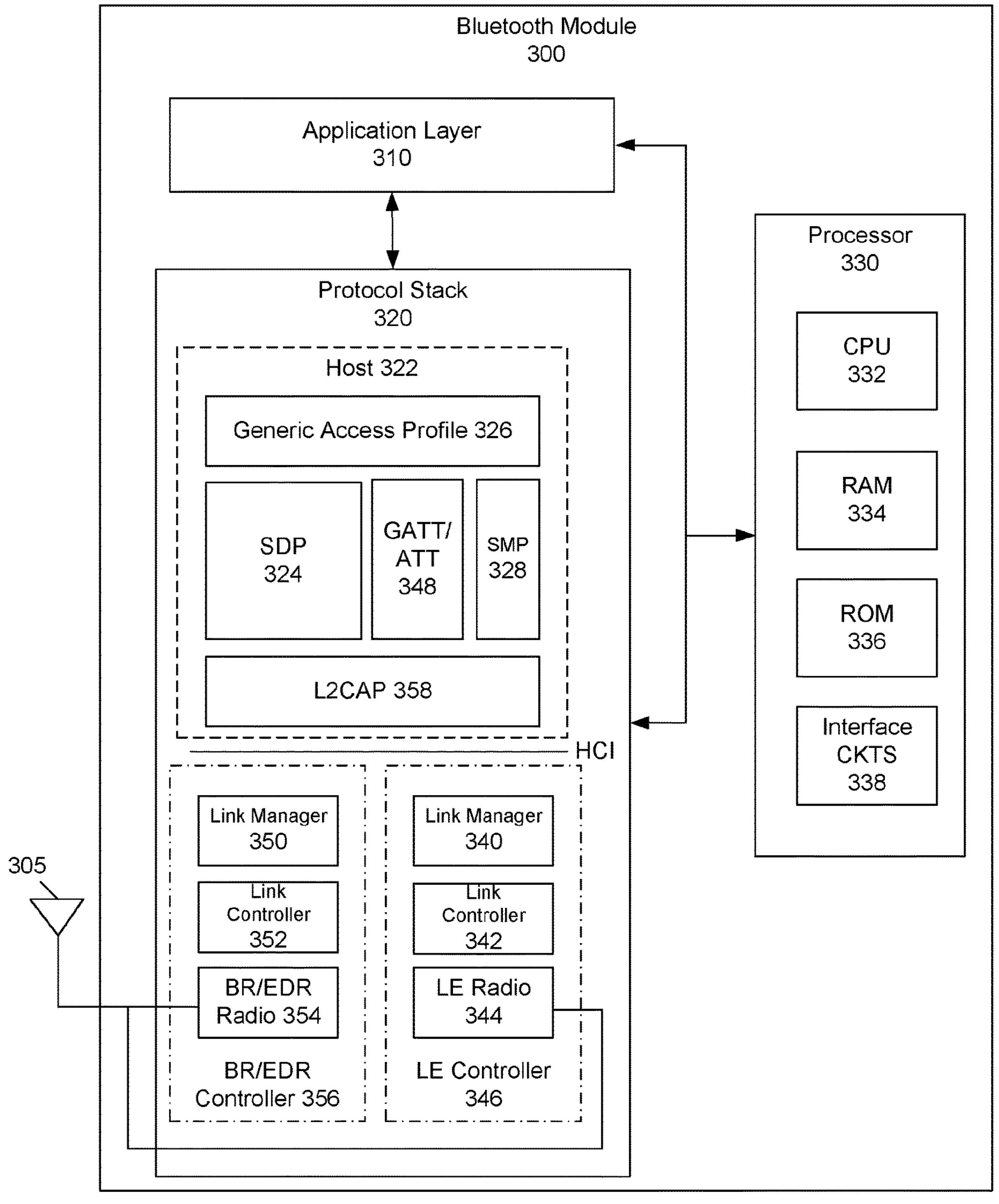
FIG. 3 illustrates a schematic block diagram of a Bluetooth™ module, according to embodiments disclosed herein.

FIG. 3 is a block diagram of an example of the local-area communication module of FIG. 2 implemented as a Bluetooth™ according to the embodiments herein. While the following description is provided with reference to the Bluetooth™ standards and protocols, embodiments herein are not to be limited thereto. The Bluetooth™ implementation is provided as an illustrative example only, other local-area communication protocols and standards may be utilized by the embodiments disclosed herein. FIG. 3 illustrates an example of a Bluetooth™ module 300 or chipset (e.g., as one or more discrete chips, an ASIC, SoC, FPGA, etc.) that may be implemented as local-area communication modules 172 and 144. Each module may include a Bluetooth™ antenna 305 in accordance with some of non-limiting examples of the disclosed embodiments.

The Bluetooth™ module 300 includes application layer 310, a Bluetooth™ protocol stack 320, and a processor 330 that includes, for example, a central processing unit (CPU) 332 (such as a dual core CPU or any other multicore CPU having any number of processor cores), a random access memory (RAM) 334, a read only memory (ROM) 336, and interface circuits 338 to interface with Bluetooth™ radio(s). The RAM 334 and ROM 336 may be implemented using any known type of semiconductor memory.

There are two forms of Bluetooth™ wireless technology systems: Basic Rate (BR)/Enhanced Data Rate (EDR) and Low Energy (LE). Both systems include device discovery, connection establishment and connection mechanisms. The Bluetooth™ module may be implemented as a single mode or dual mode chipset.

A single mode chipset is a BLE-only chipset that is optimized for ultra-low power operation, and that can communicate using BLE architecture (e.g., a BLE protocol stack) to transmit and receive. Single-mode chips can operate for long periods (months or even years) using a coin cell battery (e.g., a 3V, 220 mAh CR2032). By contrast, dual-mode chipsets are capable of communicating with legacy Bluetooth™ technology and other dual-mode chipsets using a BR/EDR Bluetooth™ architecture (e.g., a BR/EDR protocol stack), as well as BLE technology. As such, the Bluetooth™ module 300 may be in the form of Bluetooth™ Low Energy (BLE) protocol stack, a Bluetooth™ BR/EDR protocol stack, or a combination of both protocol stacks (as described below in connection to FIG. 3).

The BLE protocol stack is optimized for occasional connections that allow for longer sleep times between connections, small data transfers, very low duty cycles and simpler topology than legacy Bluetooth™ devices. Some characteristics of BLE technology that underlie help achieve ultra-low power (ULP) performance are maximized standby time, fast connection, and low peak transmit/receive power. Legacy Bluetooth™ employs a "connection oriented" radio with a fixed connection interval. In contrast, BLE technology employs a variable connection interval that can be set from a few milliseconds to several seconds depending on the application. In addition, because it features a very rapid connection, BLE technology can normally be in a connectionless state where the two ends of a link are aware of each other, but link up only when absolutely necessary and then for as short a time as possible. This connectionless operational mode of BLE technology ideally suits transmission of data where fully asynchronous communication can be used to communicate to send low volumes of data infrequently.

The protocol stack 320 and/or application layer 310 may be embodied as program logic stored in the RAM 336 and/or ROM 337 in the form of sequences of programmed instructions which, when executed in the CPU 332, carry out at least some of the functions of the disclosed embodiments. The program logic may be delivered to the RAM 336 or ROM 337 from a computer program product in the form of computer-usable media such as resident memory devices, smart cards or other removable memory devices. Alternately, they may be embodied as integrated circuit logic in the form of programmed logic arrays or custom designed application specific integrated circuits (ASICs). In some implementations, the program logic may be downloaded from such computer readable media to be stored, for example, in the RAM 262 or programmable ROM 336 for execution by the CPU 332.

The application layer 310 may provide an interface between the Bluetooth™ module 300 and other applications on devices in which the Bluetooth™ module 300 is included (e.g., external device 140 and/or gateway 130). For example, the application layer 310 may provide data signals from the Bluetooth™ module 300 according to an API, which defines the manner in which Bluetooth™ module 300 may interact with other operating systems. A corresponding API and/or driver may be installed on the underlying device for receiving and translating the data signals for controlling and interacting with the applications and systems executed thereon.

Each Bluetooth™ protocol may correspond to a respective radio 356 and 346 as separate transceiver circuits coupled to the antenna 305. In some embodiments, the radios may be a single radio module capable of handling one or multiple channels in a high speed, time and frequency multiplexed manner.

1.2.1. Bluetooth™ Protocol Stack

In the description that follows details will be provided regarding some of the layers of the Bluetooth™ protocol stack 320. Further layers and details regarding each layer are described in the Bluetooth™ Specification Version 5.2.

The protocol stack 320 comprises a host 322 and one or more controllers. A minimal implementation of the Bluetooth™ BR/EDR system comprises the four lowest layers and associated protocols defined by the Bluetooth™ specification as well as one common service layer protocol, the Service Discovery Protocol (SDP) 324 with the overall profile requirements specified in the Generic Access Profile (GAP) 326. A minimal implementation of a BLE-only core system also comprises the four lowest layers and associated protocols defined by the Bluetooth™ specification as well as two common service layer protocols, the Security Manager Protocol (SMP) 328 and Attribute Protocol (ATT) 348 and with the overall profile requirements are specified in the Generic Attribute Profile (GATT) 348 and GAP 326. Implementations combining Bluetooth™ BR/EDR and LE include both of the minimal implementations described above.

As described above, the Bluetooth™ module 300 may include one or more of the Bluetooth™ Low Energy (BLE) protocol stack and the Bluetooth™ BR/EDR protocol stack. That is, the protocol stack 320 may include fewer than the illustrative blocks in accordance with the protocol stack implemented.

FIG. 3 shows the core blocks, each with its associated communication protocol. Link Manager 350, Link Controller 352 and BR/EDR Radio 356 blocks comprise a BR/EDR Controller 356. Link Manager 340, Link Controller 342 and LE Radio 344 blocks comprise an LE Controller 346. Logical Link Control and Adaptation Protocol (L2CAP) 358, SDP 324 and GAP 326 blocks comprise a BR/EDR host. L2CAP 358, SMP 328, ATT 348, GAP 326 and GATT 348 blocks comprise an LE Host. Host 322 illustrates a BR/EDR/LE host that combines the set of blocks from each respective host. This is a common implementation involving a standard physical communication interface between the controller and the host.

Communication between the host and the controller is standardized as the Host Controller Interface (HCl). Non-core profiles (i.e., application layer 310 functionality not defined by the Bluetooth™ specification) can be implemented on top of the host.

The L2CAP 358 layer is expected to carry out some simple resource management when submitting L2CAP protocol data units (PDUs) to the respective controller for transport to a connected device. This includes segmentation of L2CAP service data units (SDUs) into more manageable PDUs and then the fragmentation of PDUs into start and continuation packets of a size suitable for the respective controller buffers, and management of the use of respective controller buffers to ensure availability for channels with Quality of Service (QoS) commitments.

The L2CAP 358 provides data services to upper layer protocols like the SMP 328, ATT 348, and SDP 324. It is responsible for protocol multiplexing and data segmentation for the controllers, and de-multiplexing and reassembly operation on the other end. The L2CAP 358 is a backend interface for the GAP 326, which defines the generic procedures related to the discovery of BLE devices and link management aspects of connecting to other BLE devices.

The SMP 328 is responsible for device pairing and key distribution for the BLE protocol. The SMP 328 defines how the device's security manager communicates with its counterpart on a connected device. The SMP 328 provides additional cryptographic functions that may be used by other components of the stack. BLE utilizes the standard AES-128 bit crypto engine and uses a pairing mechanism for key distribution. The SMP 328 provides a mechanism to not only encrypt the data but also to provide data authentication.

The SMP 328 is the peer-to-peer protocol used to generate encryption keys and identity keys. The protocol operates over a dedicated fixed L2CAP channel. The SMP 328 block also manages storage of the encryption keys and identity keys and is responsible for generating random addresses and resolving random addresses to known device identities. The SMP block 328 interfaces directly with the Controller to provide stored keys used for encryption and authentication during the encryption or pairing procedures.

The SMP block 328 is only used in BLE systems. Similar functionality in the BR/EDR system is contained in the Link Manager block 352 of the BR/EDR Controller 356. SMP 328 functionality is in the host 322 on BLE systems to reduce the implementation cost of the BLE-only Controllers.

The ATT block 348 implements the peer-to-peer protocol between an attribute server and an attribute client. The ATT client communicates with an ATT server on a remote device over a dedicated fixed L2CAP channel. The ATT client sends commands, requests, and confirmations to the ATT server. The ATT server sends responses, notifications and indications to the client. These ATT client commands and requests provide a means to read and write values of attributes on a peer device with an ATT server.

The GATT 348 describes a service framework using the ATT 348 for discovering services, and for reading and writing characteristic values on a peer device. It interfaces with the application through the application's profiles. The application profile itself defines the collection of attributes and any permission needed for these attributes to be used in the communication.

The GATT 348 block represents the functionality of the attribute server and, optionally, the attribute client. The profile describes the hierarchy of services, characteristics and attributes used in the attribute server. The block provides interfaces for discovering, reading, writing and indicating of service characteristics and attributes. GATT 348 is used on BLE devices for BLE profile service discovery.

In implementations where the BR/EDR and BLE systems are combined, the architectural blocks may be shared between systems or each system may have their own instantiation of the block.

The Link Managers 350 and 340 are responsible for the creation, modification and release of logical links (and, if required, their associated logical transports), as well as the update of parameters related to physical links between devices. The Link Managers 350 and 340 achieve this by communicating with the link manager in remote Bluetooth™ devices using a Link Manager Protocol (LMP) in BR/EDR and a Link Layer Protocol (LL) in LE.

The LM or LL protocol allows the creation of new logical links and logical transports between devices when required, as well as the general control of link and transport attributes such as the enabling of encryption on the logical transport, the adapting of transmit power on the physical link, or the adjustment of QoS settings in BR/EDR for a logical link.

The Link Controllers 352 and 342 are responsible for the encoding and decoding of Bluetooth™ packets from the data payload and parameters related to the physical channel, logical transport and logical link. The Link Controller 352 and 342 carries out the link control protocol signaling in BR/EDR and Link Layer protocol in LE (in close conjunction with the scheduling function of the resource manager), which is used to communicate flow control and acknowledgment and retransmission request signals. The interpretation of these signals is a characteristic of the logical transport associated with the baseband packet. Interpretation and control of the link control signaling is normally associated with the resource manager's scheduler.

Physical blocks (e.g., respective radio 354 and 344) are responsible for transmitting and receiving packets of information on the physical channel. The PHY block transforms a stream of data to and from the physical channel into required formats for downstream processing.

The GAP 326 block represents the base functionality common to all Bluetooth™ devices such as modes and access procedures used by the transports, protocols and application profiles. GAP 326 services include device discovery, connection modes, security, authentication, association models and service discovery.

The GAP 326 profile defines the generic procedures related to discovery of Bluetooth™ devices (idle mode procedures) and link management aspects of connecting to Bluetooth™ devices (connecting mode procedures). It also defines procedures related to use of different security levels. In addition, this profile includes common format requirements for parameters accessible on the user interface level.

1.2.2. Discovery

In order to establish a connection between Bluetooth™-enabled devices and gateways, Bluetooth™-enabled devices must be set to a discoverability mode. The discoverability of devices may be toggled, for example, by the end user through operation of a switch or other input on a Bluetooth™-enabled device. Such operation may activate the Bluetooth™ module in the device and initiate a discovery procedure. In another example, a Bluetooth™-enabled device may not require user intervention to place Bluetooth™-enabled device into discoverability mode, instead such devices may be in discoverability mode upon being turned on and transmit a pulsed broadcast signal. The GAP 326 is related to managing the discoverability of Bluetooth™-enabled devices in both the BR/EDR and BLE protocols.

Discovery procedures of Bluetooth™-enabled devices in the BR/EDR protocol utilize an inquiry procedure to discover nearby devices, or to be discovered by devices in their locality. The inquiry procedure is asymmetrical. A Bluetooth™ device that tries to find other nearby devices is known as an inquiring device and is placed in an idle mode and actively sends inquiry requests. Bluetooth™ devices that are available to be found are known as discoverable devices and listen for these inquiry requests and send responses. The inquiry procedure uses a special physical channel for the inquiry requests and responses.

The purpose of the inquiry procedure is to provide the initiator (e.g., the inquiring device) with the BD_ADDR, clock, class of device, page scan mode, and extended inquiry response information of devices in discoverable mode. During the device discovery procedure, first an inquiry is performed and a list of discovered Bluetooth™ devices is returned, which includes the BD_ADDR included with an inquiry response for each device. Each responding device transmits a corresponding BD_ADDR and inquiry response in response to a received inquiry. Then name discovery is performed towards some or all of the devices that responded to the inquiry to discover a device name for each device.

BLE uses a push model instead of the inquiry based pull model used in legacy Bluetooth™ wireless technology. In BLE, advertising broadcasts (or beacons) are also used as a method for a device to indicate to surrounding devices that it is connectable with other devices or a specific device. Devices listening for advertising broadcasts may also be in an exclusive connectable mode where they respond only when receiving connectable advertising broadcasts from devices wishing to connect to another device. The advertising broadcasts may include the BD_ADDR, advertising data, and scan response data.

In the BLE protocol, devices that wish to be discovered by other devices use broadcast advertising (or beacons) to devices listening for such broadcasts, whereas legacy Bluetooth™ protocol places devices wishing to be discovered by other devices in a listening mode for broadcasts from inquiring devices before sending device information.

1.2.3. Pairing

Once the devices are discovered, the end user initiates a pairing procedure. However, some devices do not require pairing, but are otherwise in a promiscuous mode and can be associated with another device without pairing. Such devices broadcast their information and user intervention is required on the receiving device to communicate, but pairing (e.g., establishing of a link key or long term key as described below) need not be executed to be associated for communication to proceed. The broadcasting device is configured to communicate with any device that accepts its message. Yet, in either case, user intervention is required in order for the devices to exchange information.

Conventional pairing over a BR/EDR physical link and/or a BLE physical link requires that the end user initiates a bonding procedure through a physical user input into an input interface of the devices. The user input may comprise entering a passkey or be requested to enter the passkey, with the explicit purpose of creating a bond (and maybe also a secure relationship) between two Bluetooth™ devices since the devices did not share a common link key beforehand. In the first case, the end user is required to perform some physical input on the devices to bond and thereby establish a connection. In some embodiments, pairing devices may exchange PIN codes using software at the application layer 310 rather than via human interaction; however, human intervention is still required to initiate the pairing by either accepting an invitation to pair or selecting a device to pair with.

The end user initiates pairing using an application running on the device. The input from the end user is provided to the application layer 310, which is then supplied to the protocol stack 320 to initiate the pairing procedure. Pairing over a BR/EDR physical link is defined in LM 332 protocols. Pairing over an LE physical link is defined by the SMP 328.

During pairing, the two devices establish a relationship by creating a shared secret known as a link key in the BR/EDR protocol and a long term key in the BLE protocol. In both protocols, the respective key is derived based on the minimal information provided during the discovery procedure, for example, the respective keys are derived based on the BD_ADDR as described below. If both devices store the same key, they are said to be paired or bonded. A device that wants to communicate only with a bonded device can cryptographically authenticate the identity of the other device, ensuring it is the same device it previously paired with.

In BR/EDR protocols, the link key is derived from at least the BD_ADDR, and in several embodiments the link key is derived from a random number, an L-octet PIN code, and the BD_ADDR. The PIN may be a fixed number provided with a Bluetooth™-enabled device or selected by the user, and then entered in both devices that are to be matched. The BD_ADDR is supplied during the discovery procedure. Pairing devices may exchange PIN codes using software at the application layer 310 rather than via human interaction. When the initialization key is generated, the PIN may be augmented with the BD_ADDR.

Link keys must be generated and distributed among the devices in order to be used in the authentication procedure. Since the link keys are secret, they shall not be obtainable through an inquiry routine in the same way as the Bluetooth™ device addresses may be obtained. The exchange of the keys takes place during an initialization phase which is carried out separately for each two devices that are using authentication and encryption. The initialization procedures consist of generation of an initialization key, generation of link key, link key exchange, authentication, and (optionally) generation of encryption key in each device.

After the initialization procedure, the devices can proceed to communicate, or the link can be disconnected. If encryption is implemented, an algorithm may be used with an encryption key derived from the current link key. A new encryption key derived from that particular link key shall be created next time encryption is activated. If no link key is available, the LM 350 shall automatically start an initialization procedure.

For the BLE protocol, pairing is performed to establish keys which can then be used to encrypt a link. A transport specific key distribution is performed to share keys which can be used to encrypt a link in future reconnections, verify signed data and random address resolution. The SMP 328 uses a key distribution approach to perform identity and encryption functionalities in radio communication. This means that each device generates and controls the keys it distributes and no other device affects the generation of these keys. The strength of a key is as strong as the algorithms implemented inside the distributing device. Unlike BR/EDR protocols, the BLE protocol generates a long term key based, in part, on authenticating a pairing device based on its BD_ADDR. For example, pairing in BLE is initiated by an initiating device sending a public key (of public-private key pair of the initiating device, where the private key is a secret key). The responding device replies with its own public key. Both devices validate received public keys based on the BD ADDR of the providing device. Additional details can be found in the Bluetooth™ Core Specification Version 5.2, revision date Dec. 31, 2018, incorporated by reference herein in its entirety.

Once a respective key is generated and pairing procedures are performed, an authenticated link between the devices may be encrypted to protect exchanged data against eavesdropping. Users can delete keys from either device, which removes the bond between the devices—so it is possible for one device to have a stored link key for a device it is no longer paired with. Link keys may be stored on the device file system, not on the Bluetooth™ module itself.

2. Process Overview

The requirement for human intervention in initiating the discoverability and/or pairing of devices according to the Bluetooth™ protocols may be cumbersome and inhibiting to progress and integration of Bluetooth™-enabled devices into the field. Specifically, it may be difficult to associate or pair devices where one or more of the devices lacks a conventional user interface, such as a smart phone or a personal computer. These devices may require activation through a physical button, a web portal interface, or may automatically be placed in discoverability mode. However, where two such devices are attempting to associate or pair, it may not be possible to associate or pair two devices that lack a conventional user interface. Accordingly, in various embodiments, the gateway 130 provides an inexpensive and fully automated means for discovering and associating or pairing valid devices that simplifies and removes the need for user intervention to discover and associate or pair the devices with the gateway 130.

Other communication protocols (e.g., Z-wave™, ZigBee™, Wi-Fi™, etc.) suffer from similar inhibiting requirements of human intervention to facilitate pairing and/or associating devices. While the protocols may differ, the same deficiencies are present and embodiments herein are equally applicable to any communication protocol.

In various embodiments, gateway 130 is configured to retrieve a list of device IDs associated with its gateway ID that are indicative of devices that have been authenticated and approved for communication with the gateway 130. The device IDs may be associated with the gateway ID in a remote database (e.g., database 114) based on obtaining the respective IDs. It will be appreciated that obtaining the respective IDs for storage in database 114 does not require either device be activated. Instead, the IDs may be scanned or obtained from a database (e.g., database 152). When an external device is detected by the gateway 130 (e.g., via a broadcast signal advertising its presence), that gateway 130 may receive a device ID of the detected device included in the detected signal and compare the received ID against those stored in its memory. If a match exists, then the device is designated as valid and the association or pairing procedure is initiated automatically. By validating a device as provided herein, pairing may be performed without requiring human intervention since the device is already authenticated and validated, thereby removing the need to further verify that the device is permitted to communicate with the gateway 130.

Embodiments of processes for auto-association and auto-pairing of one or more devices to a gateway will now be described in detail. It should be understood that the described processes may be embodied in one or more software modules that are executed by one or more hardware processors, which may be executed wholly by processor(s) of platform 110, wholly by processor(s) of gateway(s) 130 and/or user system(s) 150, or may be distributed across platform 110 and gateway(s) 130 and/or user system(s) 150 such that some portions or modules of the application are executed by platform 110 and other portions or modules of the application are executed by gateway(s) 130 and/or user system(s) 150. The described process may be implemented as instructions represented in source code, object code, and/or machine code. These instructions may be executed directly by the hardware processor(s), or alternatively, may be executed by a virtual machine operating between object code and the hardware processors. In addition, the disclosed application may be built upon or interfaced with one or more existing systems.

2.1. Bundling

Figure 4:
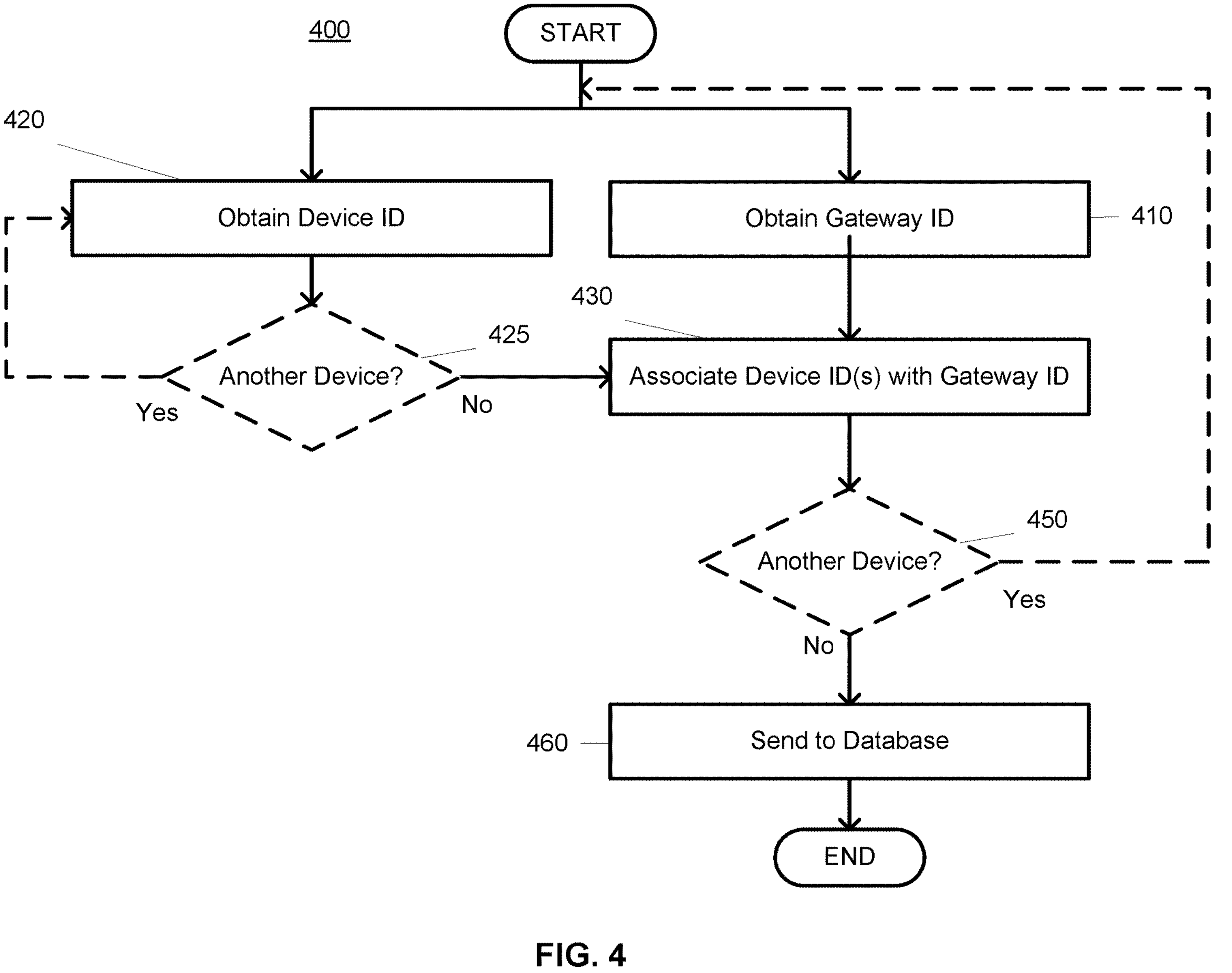
FIG. 4 illustrates a process bundling one or more device IDs with a gateway ID, according to embodiments disclosed herein.

FIG. 4 illustrates a process 400 for bundling a gateway 130 with one or more external devices 140, according to an embodiment. The process 400 may be performed for multiple gateways 130 so to kit one or more external devices 140 to respective gateways 130. The process 400 may be performed by a user system 150 comprising database 152 and/or scanner devices(s) 154. The user system 150 may be associated with, co-located at, or communicatively coupled to a warehouse of a device manufacturer, gateway manufacturer, distribution center, or other location where bundling multiple devices with a gateway may be utilized. The process 400 may be part of an overarching process of bundling physical devices with physical gateways for shipment and delivery.

In step 410, a unique gateway ID for a given gateway 130 is obtained. For example, a unique gateway ID associated with the gateway 130 may be retrieved, for example, from a database(s) 152 of IDs. In some embodiments, the database 152 may be organized by serial and/or product number. Thus, the unique gateway IDs for each gateway may be obtained from a lookup database by using the serial or other unique number to retrieve the ID. In another example, the serial or other unique number may be retrieved from the database 152 using another record locator. In another example, alone or in combination, the unique gateway IDs may be affixed to the gateway 130 and/or a package containing (or arranged to contain) the gateway 130 during shipment, for example, by a label or tag that contains the unique gateway ID and obtained by reading or otherwise scanning the label or tag. The tag or label may be in the form of a barcode, a QR code, or other uniquely identifiable code that is attached to or otherwise printed onto the gateway 130. In some embodiments, the unique gateway ID may be stored in an RFID tag affixed to the gateway 130. As another example, the unique IDs may be provided by the OEM of the gateway 130. As another example, the unique ID may be obtained by activating the gateway 130 and reading the unique ID from a signal generated by the gateway 130.

In some embodiments, the unique gateway ID may be the BD_ADDR for the gateway 130, MAC address, etc., as described above. In another embodiment, the unique ID may be any unique string of characters that uniquely identify the gateway 130 from other devices. The unique gateway ID may be used to retrieve and/or derive a BD_ADDR or other parameter necessary for discovery and pairing with another device.

In step 420, a unique device ID corresponding to an external device 140 is obtained in a manner similar to that described above in step 410. In optional step 425, it may be determined if there are additional external devices 140 to be kitted (e.g., bundled) with the gateway 130. If there are additional devices, then the process performs step 420 for each additional external device 140. Otherwise, if there are no additional external devices 140 to be kitted with the gateway 130, then the process continues to step 430. If step 425 is not performed, then the process 400 may be executed for each device/gateway pair, thereby associating each device ID with a gateway ID. Whereas, by performing step 425, one or more device IDs may be associated with a single gateway ID forming a group of unique device IDs associated therewith.

In step 430, the IDs obtained at steps 410 and 420 are associated with each other. For example, the IDs may be entered into a data structure organized by gateway IDs in a first column and device IDs associated with each gateway ID in each corresponding row. As another example, the gateway IDs may be provided in each row and the device IDs associated there positioned in each column. While examples of associating the obtained IDs are provided herein, it will be appreciated that any method for collecting and associating data may be implemented. The associated IDs are then transmitted to database 114 as a pair (or group where applicable) for storage at step 460.

In optional step 450, it may be determined if there are additional gateways 130 to be bundled. If there are additional gateways, then the process performs step 410 for each additional gateway 130. Otherwise, if there are no additional gateways 130, the process continues to step 460.

In some embodiments, steps 410 and 420 may be performed at the same time or sequentially. In some embodiments, step 410 may be performed first followed by step 420 and process 400 proceeds as shown in FIG. 4. In another embodiment, step 420 may be performed before step 410. In another example, optional step 450 may be performed before optional step 425. Thus, the process 400 may determine at step 450 that additional gateways 130 are to be associated with a given external device and repeat step 410. Thus, embodiments herein permit bundling of one gateway 130 with one external device 140, one gateway 130 with multiple external devices 140, multiple gateways 130 with multiple external devices 140, and/or multiple gateways 130 with one external device 140.

Once process 400 is completed for a given gateway 130, the physical devices and gateways may be bundled (e.g., packaged together or separately) and distributed to a respective destination. Thus, the process 400 may be performed at a device manufacturer, gateway manufacturer, or distribution center, where the devices are to be bundled and/or packaged with a gateway.

2.2. Associating/Pairing Devices with a Gateway

Figure 5:
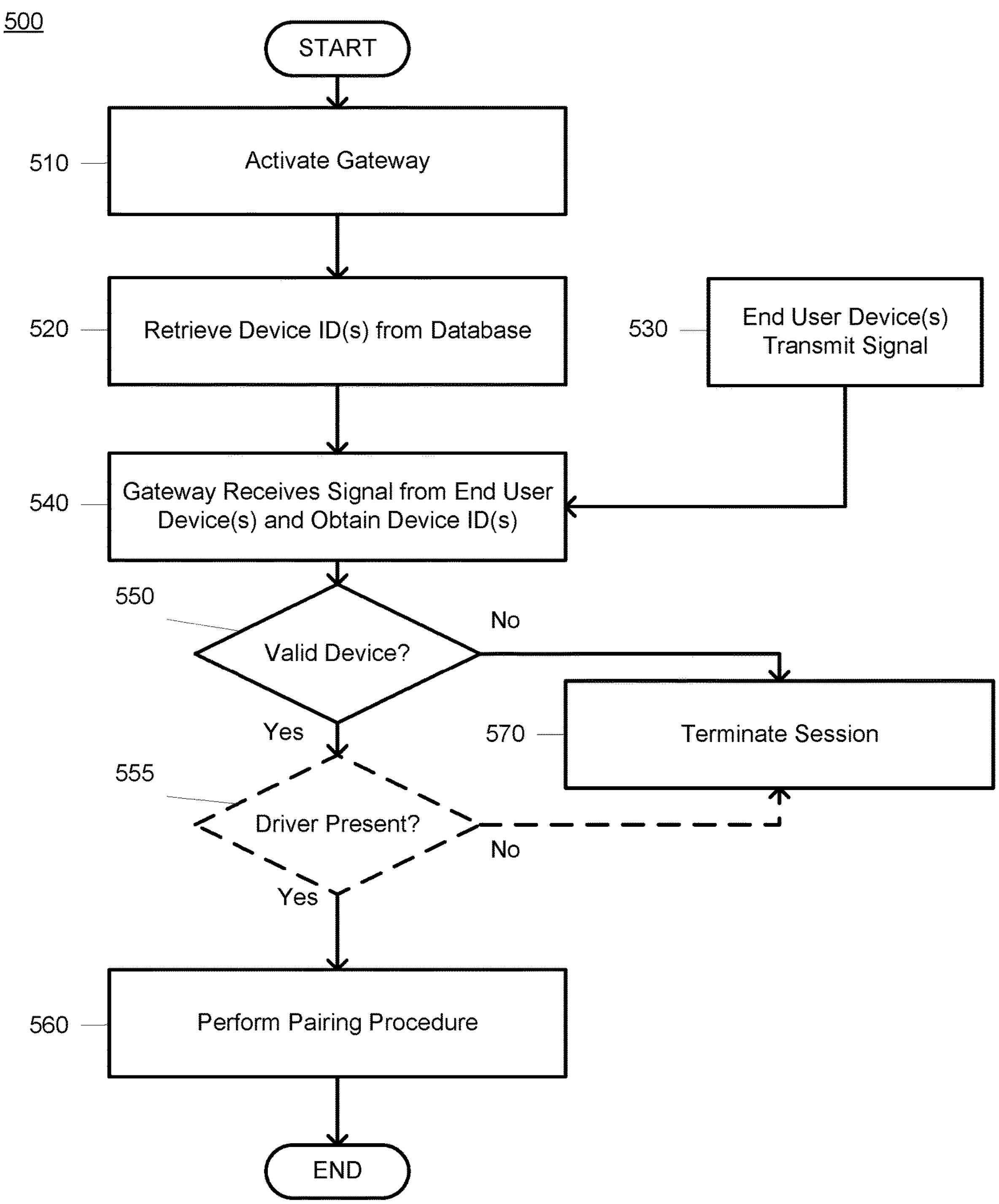
FIG. 5 illustrates a process for automatic pairing of devices to a gateway, according to embodiments disclosed herein.

FIG. 5 illustrates an auto-associating and/or auto-pairing process 500 (further referred to collectively as pairing), according to an embodiment. Process 500 may be performed wholly by platform 110 and/or wholly by a gateway 130, or may be distributed across platform 110, gateway 130 and/or device(s) 140 such that some portions or modules of the application are executed by platform 110 and other portions or modules of the application are executed by gateway(s) 130 and/or device(s) 140.

In step 510, a gateway 130 is activated. For example, a customer turns on or otherwise supplies power to the gateway 130 to activate and power up the gateway 130. In various embodiments, activating the gateway 130 need not include activating the local-area communication module therein (e.g., Bluetooth module). In response to activation and following successful connection to platform 110 via network 120, in step 520 the gateway 130 retrieves one or more unique device IDs associated with the gateway device from database 114. For example, the gateway 130 may download a list of the unique device IDs via network 120. The unique device IDs may be associated with the gateway 130 via process 400. Accordingly, the gateway 130 may transmit its gateway ID and a request for the device IDs associated with the transmitted gateway ID to server 112. The request may be executed as a GET request as is known in the art. The server 112 may retrieve the device IDs from database 114 based on using the gateway ID to locate the device IDs in the database 114 and transmit the associated device IDs to the gateway 130. The gateway 130 then stores the device IDs in the memory 134. The received list of device IDs may be representative of the valid devices permitted to access third party system 180 via the gateway 130.

In some embodiments, the process 400 may be performed prior to activation of the gateway 130 and available for download upon activation. In some embodiments, the device IDs associated with a given gateway ID may be updated in database 114 periodically by execution of process 400 (e.g., adding devices to be bundled with the gateway 130 after shipping to the end user). Thus, the gateway 130 may perform step 520 each time the gateway 130 is brought online or otherwise activated. Additionally, the gateway 130 may perform step 520 periodically at a predetermined time interval (e.g., once a day, month, etc. as set in a configuration file of the gateway 130). Thus, the gateway 130 is configured to maintain an up-to-date list of valid devices by dynamically updating the device ID associations.

In some embodiments, the platform 110 may be configured to push a list of device IDs to the gateway 130 at step 520, for example, by using a POST request. In an example, process 400 may be performed to update the device IDs associated with a given gateway ID in database 114 and transmit a POST request to push the updated list to the gateway 130 either automatically in response to the update or at a periodic time interval. Thus, the device IDs associated with a gateway 130 may be dynamically updated.

The above ability to provide an updated list of device IDs may be advantageous to streamline replacement devices and additional devices. For example, where a first device becomes defective or otherwise unusable, a replacement device may be provided. Prior to shipping the replacement device, process 400 may be executed to update the list of device IDs associated with the gateway ID in database 114. This replacement device ID may then be communicated (e.g., retrieved by the gateway 130 or pushed by the platform 110) to the gateway 130 and stored therein.

In another embodiment, the gateway 130 may be preloaded with a list of one or more unique device IDs. For example, during the bundling process, manufacture, and/or configuration of the gateway 130, one or more unique device IDs may be loaded into the gateway 130 and stored therein.

In step 530, one or more external devices 140 transmit a wireless signal and, in step 540, the gateway 130 receives the signal and obtains a device ID from the device. For example, the external device 140 may broadcast a wireless signal comprising its device ID. The gateway external device 140 receives this wireless signal, detects the external device 130, and decodes the signal to obtain the device ID therefrom. In some embodiments, the external device 140 is set to discoverability mode upon being turned on, thus the device may broadcast the wireless signal upon activation. For example, the gateway 130 may be configured to enter a scanning mode upon activation and, during the scanning mode, it will receive, over time, a list of external devices and corresponding unique IDs that are making them visible for discovery.

In some implementations, the list of external devices at step 540 may be generated based on a white list, which maybe optionally included in the communication module. For example, BLE standards provides for an optional white list in the LE controller 346 that enumerates devices that are allowed to communicate with the gateway. When the white list in the BLE standards are in effect, transmissions from devices not on the white list are ignored. Thus, at step 540, the gateway device may scan nearby devices to generate the list of external devices, and if the white list is in effect only those contained in the white list will be included in the list of external devices and corresponding unique IDs.

In some embodiments, the wireless signal may be transmitted according to either BR/EDR Bluetooth™ standards or BLE standards as described above. For example, the Bluetooth™ module 300 of the external device 140 may be configured to automatically broadcast a discoverable wireless signal upon activation, without requiring any user input to activate the Bluetooth™ signal. That is, the external device 140 may be automatically discoverable without requiring human intervention (and may not have a user input to toggle the discoverability), thereby automatically emitting an advertisement signal (where implementing the BLE standard) once turned on. Where the BR/EDR standard is implemented, the signal broadcasted from the device 140 may be similar to the inquiry response signal comprising the BD_ADDR, thus not necessitating an initial inquiry request for a BD_ADDR from the gateway 130. In another embodiment, the discoverability of the external device 140 may be toggled via a button or other switch input on the external device 140. However, even in this case, once toggled-on pairing may be performed automatically, because the signal with the device ID may be broadcast in response to the toggling, and the process 500 proceeds accordingly.

In step 550, the gateway 130 determines whether the obtained device ID is valid. If the device ID is valid, then, in step 560, the process 500 proceeds to automatically perform pairing procedures according to the communication protocol implemented, for example, Bluetooth™ standards (e.g., generation of a linking key or a long term key in accordance with the Bluetooth™ protocol implemented by the protocol stack 320 of both the external device 140 and the gateway 130). If the device ID is not valid, then the session is terminated in step 570, the external device 140 is not permitted to pair with the gateway 130, and is not permitted access to network 120. For example, the gateway 130, at step 570, may be configured to drop connection or otherwise disconnect from the external device 140. Step 550 comprises comparing the device ID obtained from the external device 140 against those obtained in step 520. If the device IDs match, then the device is designated as a valid device. If there is not a match, then the device is not valid.

In some embodiments, the process 500 may include optional step 555, where it is determined whether the driver for the external device 140 is presently installed in the gateway 130. If the driver is not present, then the process may proceed to step 570. If the driver is present, then the process may continue to step 555. In some implementations, if the driver is not present, then the gateway 130 may be configured to query network 120 for the driver, download the necessary driver, and then proceed to step 560. For example, if the device is valid at step 550 (e.g., due to an updated list of valid devices) then it may be that the gateway 130 has not yet updated the drivers, and the determination at step 555 may be indicative of a need to update.

In some embodiments, the device 140 may not require pairing with another device. Instead, the device 140 may be in a promiscuous mode and broadcasting both data and the device ID for any device to receive. In this case, the process 500 proceeds in a manner substantially similar to that described above, except that if a match for the device ID exists (e.g., the device is valid) then the gateway 130 will automatically pass the data onto the third party system. No further communication between the device 140 and the gateway 130 is required.

While the embodiments herein may be described with reference to Bluetooth™ standards, the scope of the description is not so limited to Bluetooth™. The embodiments herein are equally applicable to automatically pair and/or associate gateways 130 and external devices 140 for communications over any communication protocol, for example, but not limited to, Z-wave™, ZigBee™, Wi-Fi™, etc. When implemented in any such protocol, the bundling process 400 may be used to associate unique IDs and store the pairing information (e.g., the associated IDs) in the database. Upon activation during process 500, unique IDs are provided to the gateway 130 and pairing procedures unique to each communication protocol may be executed automatically if the unique ID for a given external device 140 is valid on the gateway 130.

3. Example Processing Device

Figure 6:
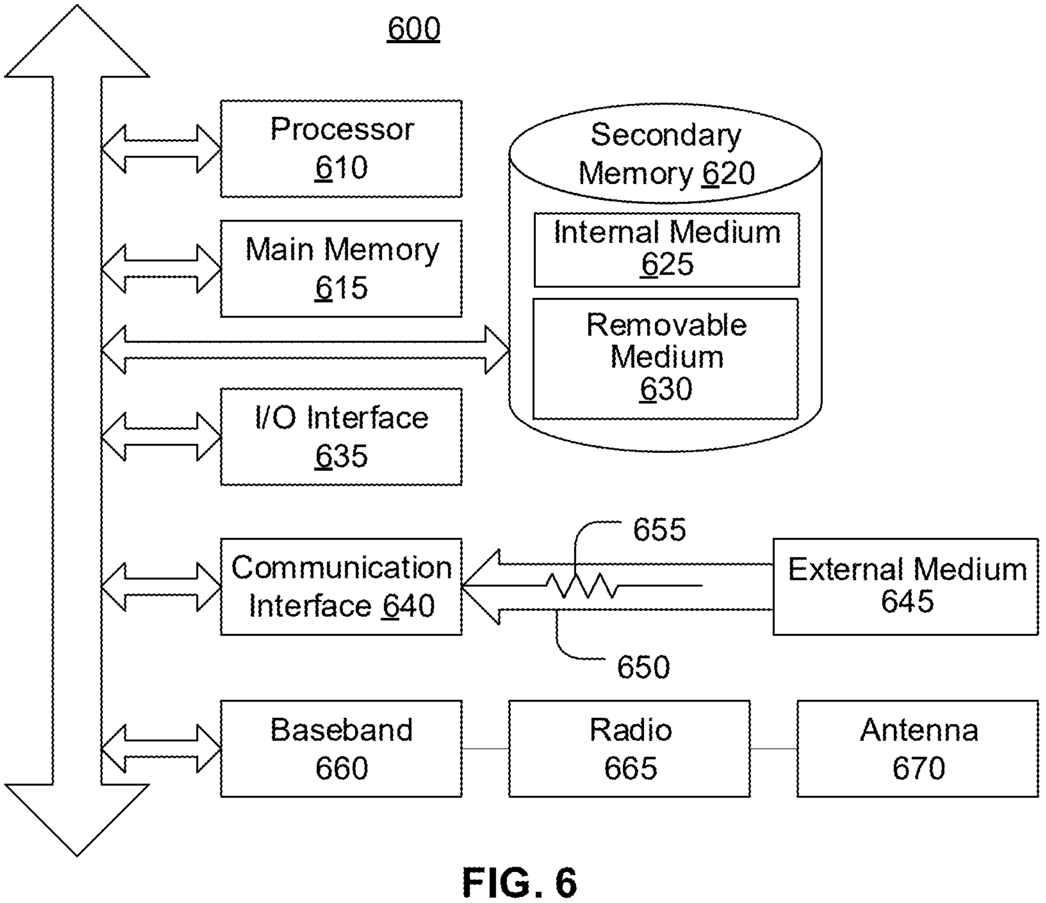
FIG. 6 illustrates a processing system on which one or more of the processes described herein may be executed, according to an embodiment.

FIG. 6 is a block diagram illustrating an example wired or wireless system 600 that may be used in connection with various embodiments described herein. For example, the system 600 may be used as or in conjunction with one or more of the mechanisms, processes, methods, or functions (e.g., to store and/or execute one or more software modules) described above, and may represent components of platform 110, server(s) 112, gateway(s) 130, device(s) 140, user system(s) 150, third party system(s) 180, and/or other devices described herein. The system 600 can be a server or any conventional personal computer, or any other processor-enabled device that is capable of wired or wireless data communication. Other computer systems and/or architectures may be also used, as will be clear to those skilled in the art. In addition, it should be understood that while system 600 is illustrated with certain elements, it may comprise fewer or more elements than those illustrated, depending on the particular component it represents. For example, a system 600 without wireless communication capabilities may not include baseband 660, radio 665, and antenna 670.

The system 600 preferably includes one or more processors, such as processor 610. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 610. Examples of processors which may be used with system 600 include, without limitation, the Pentium® processor, Core i7® processor, Xeon® processor, and other models available from Intel Corporation of Santa Clara, California, as well as hardware processors from other manufacturers, such as Advanced Micro Devices of Sunnyvale, California.

The processor 610 is preferably connected to a communication bus 605. The communication bus 605 may include a data channel for facilitating information transfer between storage and other peripheral components of the system 600. In addition, the communication bus 605 may provide a set of signals used for communication with the processor 610, including a data bus, address bus, and control bus (not shown). The communication bus 605 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 600 preferably includes a main memory 615 and may also include a secondary memory 620. The main memory 615 provides storage of instructions and data for programs executing on the processor 610, such as one or more of the functions and/or modules discussed above and illustrated in at least FIGS. 4 and 5. It should be understood that programs stored in the memory and executed by processor 610 may be written and/or compiled according to any suitable language, including without limitation C/C++, Java, JavaScript, Perl, Visual Basic, .NET, proprietary visual scripting languages, proprietary scripting languages, and the like. The main memory 615 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 620 may optionally include an internal memory 625 and/or a removable medium 630, for example a floppy disk drive, a magnetic tape drive, a compact disc (CD) drive, a digital versatile disc (DVD) drive, other optical drive, a flash memory drive, microSD, etc. The removable medium 630 is read from and/or written to in a well-known manner. Removable storage medium 630 may be, for example, a floppy disk, magnetic tape, CD, DVD, SD card, thumb drive, etc.

The removable storage medium 630 is a non-transitory computer-readable medium having stored thereon computer executable code (i.e., software) and/or data. The computer software or data stored on the removable storage medium 630 is read into the system 600 for execution by the processor 610.

In alternative embodiments, secondary memory 620 may include other similar means for enabling computer programs or other data or instructions to be loaded into the system 600. Such means may include, for example, an external storage medium 695 and an interface 640. Examples of external storage medium 695 may include an external hard disk drive, an external optical drive, or an external magneto-optical drive.

Other examples of secondary memory 620 may include semiconductor-based memory such as programmable read-only memory (PROM), erasable programmable read-only memory (EPROM), electrically erasable read-only memory (EEPROM), or flash memory (block-oriented memory similar to EEPROM). Also included are any other removable storage media 630 and communication interface 640, which allow software and data to be transferred from an external medium 660 to the system 600.

System 600 may include a communication interface 640. The communication interface 640 allows software and data to be transferred between system 600 and external devices (e.g., printers), networks, or information sources. For example, computer software or executable code may be transferred to system 600 from a network or cloud server via communication interface 640. Examples of communication interface 640 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 600 with a network or another computing device.

Communication interface 640 preferably implements industry-promulgated protocol standards, such as Ethernet IEEE 802 standards, Fiber Channel, digital subscriber line (DSL), asynchronous digital subscriber line (ADSL), frame relay, asynchronous transfer mode, integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 640 are generally in the form of electrical communication signals 655. These signals 655 are preferably provided to communication interface 640 via a communication channel 650. In one embodiment, the communication channel 650 may be a wired or wireless network, or any variety of other communication links. Communication channel 650 carries signals 655 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software, such as the disclosed application) is stored in the main memory 615 and/or the secondary memory 620. Computer programs can also be received via communication interface 640 and stored in the main memory 615 and/or the secondary memory 620. Such computer programs, when executed, enable the system 600 to perform the various functions of the present invention as previously described.

In this description, the terms "computer-readable medium," "storage medium," and "medium" are used to refer to any non-transitory computer readable storage media used to provide computer executable code (e.g., software and computer programs) to the system 600. Examples of these media include main memory 615, secondary memory 620 (including internal memory 625, removable medium 630, and external storage medium 695), and any peripheral device communicatively coupled with communication interface 640 (including a network information server or other network device). These non-transitory computer readable mediums are means for providing executable code, programming instructions, and software to the system 600.

In an embodiment that is implemented using software, the software may be stored on a computer-readable medium and loaded into the system 600 by way of removable medium 630, I/O interface 635, or communication interface 640. In such an embodiment, the software is loaded into the system 600 in the form of electrical communication signals 655. The software, when executed by the processor 610, preferably causes the processor 610 to perform the inventive features and functions previously described herein.

In an embodiment, I/O interface 635 provides an interface between one or more components of system 600 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 600 also includes optional wireless communication components that facilitate wireless communication over a voice and over a data network. The wireless communication components comprise an antenna system 670, a radio system 665 and a baseband system 660. In the system 600, radio frequency (RF) signals are transmitted and received over the air by the antenna system 670 under the management of the radio system 665.

In one embodiment, the antenna system 670 may comprise one or more antennae and one or more multiplexors (not shown) that perform a switching function to provide the antenna system 670 with transmit and receive signal paths. In the receive path, received RF signals can be coupled from a multiplexor to a low noise amplifier (not shown) that amplifies the received RF signal and sends the amplified signal to the radio system 665.

In alternative embodiments, the radio system 665 may comprise one or more radios that are configured to communicate over various frequencies and protocols. In one embodiment, the radio system 665 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 665 to the baseband system 660.

If the received signal contains audio information, then baseband system 660 decodes the signal and converts it to an analog signal. Then the signal is amplified and sent to a speaker. The baseband system 660 also receives analog audio signals from a microphone. These analog audio signals are converted to digital signals and encoded by the baseband system 660. The baseband system 660 also codes the digital signals for transmission and generates a baseband transmit audio signal that is routed to the modulator portion of the radio system 665. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 670 where the signal is switched to the antenna port for transmission.

The baseband system 660 is also communicatively coupled with the processor 610. The central processing unit 610 has access to data storage areas 615 and 620. The central processing unit 610 is preferably configured to execute instructions (i.e., computer programs or software) that can be stored in the memory 615 or the secondary memory 620. Computer programs can also be received from the baseband system 660 and stored in the data storage area 615 or in secondary memory 620, or executed upon receipt. Such computer programs, when executed, enable the system 600 to perform the various functions of the present invention as previously described. For example, data storage areas 615 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for automated pairing of one or more external devices to a gateway device, the method comprising:

retrieving from a database via a network interface, by the gateway device, a list of device identifiers of the one or more external devices associated with a gateway identifier of the gateway device;

receiving, by the gateway device, at least a first discovery signal from a first external device over a local-area communication interface between the first external device and the gateway device, the first discovery signal comprising a first device identifier of the first external device, and the local-area communication interface implemented according to a local area transport protocol;

determining, at the gateway device, that the first device identifier is a valid device identifier included in the list of device identifiers retrieved over the network interface; and based on the determination, executing a pairing process with the first external device according to the local-area transport protocol;

wherein the list of device identifiers is retrieved by the gateway device without user intervention and is used to automatically validate external devices attempting to pair with the gateway device.

2. The method of claim 1, wherein the retrieving of the device identifiers comprises, in response to activating the gateway device, transmitting the gateway identifier to a database over the network interface, and receiving the device identifiers from the database based on the transmission of the gateway identifier.

3. The method of claim 1, wherein the device identifiers are associated with the gateway device and stored in a database according to bundling the gateway device with the one or more external devices.

4. The method of claim 1, wherein the local-area communication interface comprises Bluetooth™ interface and the local-area transport protocol comprises Bluetooth™ protocol.

5. The method of claim 3, wherein, in response to the first external device being activated, the first external device enters discoverability mode and transmits the first discovery signal to the gateway device.

6. The method of claim 1, wherein one or more of the device identifiers are pre-loaded and stored in a memory of the gateway device, wherein the retrieving of the device identifiers comprises retrieving the device identifiers from the memory.

7. A gateway apparatus for automatic pairing with one or more external devices, comprising:

at least one network interface configured to communicate with a network;

at least one local-area communication interface configured to communicate with the one or more external devices according to a local-area transport protocol;

at least one memory configured to store instructions; and one or more processors coupled to the at least one network interface, the at least one local communication interface, and the at least one memory, the one or more processors configured to:

receive from a database via a network interface, a list of device identifiers of the one or more external devices associated with a gateway identifier of the gateway apparatus;

receive at least a first discovery signal from a first external device over a local-area communication interface between the first external device and the gateway apparatus, the first discovery signal comprising a first device identifier of the first external device, and the local-area communication interface implemented according to a local area transport protocol;

determine that the first device identifier is a valid device identifier included in the list of device identifiers retrieved over the network interface; and based on the determination, execute a pairing process with the first external device according to the local-area transport protocol;

wherein the list of device identifiers is retrieved by the gateway device without user intervention and is used to automatically validate external devices attempting to pair with the gateway device.

8. The gateway apparatus of claim 7, wherein the one or more processors are further configured to, in response to activating the gateway apparatus, transmit the gateway identifier to a database over the network interface, and receive the device identifiers from the database based on the transmission of the gateway identifier.

9. The gateway apparatus of claim 7, wherein the device identifiers are associated with the gateway apparatus and stored in a database according to bundling the gateway apparatus with the one or more external devices.

10. The gateway apparatus of claim 7, wherein the local-area communication interface comprises Bluetooth™ interface and the local-area transport protocol comprises Bluetooth™ protocol.

11. The gateway apparatus of claim 7, wherein the one or more processors are configured to route communications received from the first external device, over the local-area communication interface, to the network via the network interface, based on the pairing of the first external device to the gateway apparatus.

12. The gateway apparatus of claim 7, wherein one or more of the device identifiers are pre-loaded and stored in the at least one memory of the gateway apparatus, wherein the retrieving of the device identifiers comprises retrieving the device identifiers from the at least one memory.

13. A system for automated pairing of one or more end user devices to a gateway device, the gateway device comprising at least one memory configured to store instructions and one or more processors, the system comprising:

a database on a network, the database configured to store a gateway identifier of the gateway device and a list of device identifiers of the one or more end user devices associated with the gateway device; the gateway device comprising:

a wide-area communication module configured to communicate with the network; and a short-range communication module configured to communicate with the one or more end user devices according to a short-range communication protocol;

the gateway device configured to:

retrieve the list of device identifiers from the database over the wide-area communication module based on the gateway identifier;

receive a first device identifier from a first end user device over the short-range communication module;

determine that the first device identifier is a valid device identifier included in the list of device identifiers retrieved from the database; and based on the determination, execute a pairing process with the first end user device according to the short-range communication protocol;

wherein the list of device identifiers is retrieved by the gateway device without user intervention and is used to automatically validate external devices attempting to pair with the gateway device.

14. The system of claim 13, further comprising an identifier obtaining system communicatively coupled to the database over the network, the identifier obtaining system configured to:

obtain the device identifiers of one or more end user devices and the gateway identifier of the gateway device;

associate the obtained device identifiers with the obtained gateway identifier; and store the associated device identifiers and gateway identifier to the database.

15. The system of claim 14, wherein the identifier obtaining system comprises a scanner configured to obtain the device identifiers and the gateway identifiers from the one or more external devices and gateway device, respectively.

16. The system of claim 13, wherein the gateway device is further configured to, in response to activating the gateway device, transmit the gateway identifier to the database over the wide-area communication module, and receive the device identifiers from the database based on the transmission of the gateway identifier.

17. The system of claim 13, wherein the gateway device is further configured to:

determine whether a driver corresponding to the first end user device is installed on the gateway device;

if the driver is not installed, terminate a session between the gateway device and the first end user device or download the driver over the wide-area communication module; and if the driver is installed, execute the pairing process according to the local-area transport protocol.

18. The method of claim 1, wherein the determining that the first device identifier is a valid device identifier comprises comparing the first device identifier against the list of device identifiers without communicating with a remote server during the validation process.

* * * * *